United States Patent
Raanani et al.

(10) Patent No.: US 10,110,743 B2
(45) Date of Patent: Oct. 23, 2018

(54) AUTOMATIC PATTERN RECOGNITION IN CONVERSATIONS

(71) Applicant: AffectLayer, Inc., Tel Aviv-Yafo (IL)

(72) Inventors: Roy Raanani, Mill Valley, CA (US); Russell Levy, Raanana (IL); Dominik Facher, San Francisco, CA (US); Micha Yochanan Breakstone, Raanana (IL)

(73) Assignee: AffectLayer, Inc., Tel Aviv-Yafo (IL)

( * ) Notice: Subject to any disclaimer, the term of this patent is extended or adjusted under 35 U.S.C. 154(b) by 0 days.

(21) Appl. No.: 15/817,490

(22) Filed: Nov. 20, 2017

(65) Prior Publication Data
US 2018/0077286 A1    Mar. 15, 2018

Related U.S. Application Data

(63) Continuation-in-part of application No. 15/168,675, filed on May 31, 2016.
(Continued)

(51) Int. Cl.
*H04M 3/42* (2006.01)
*H04M 3/523* (2006.01)
(Continued)

(52) U.S. Cl.
CPC ........ *H04M 3/5175* (2013.01); *G06F 17/279* (2013.01); *G06F 17/2785* (2013.01);
(Continued)

(58) Field of Classification Search
CPC .......... H04M 3/42221; H04M 3/5232; H04M 2203/556; H04M 2203/551; H04M 3/5191
(Continued)

(56) References Cited

U.S. PATENT DOCUMENTS

| 7,023,979 B1 | 4/2006 | Wu et al. | |
| 7,039,166 B1 * | 5/2006 | Peterson | H04M 3/493 379/265.03 |

(Continued)

OTHER PUBLICATIONS

Co-Pending U.S. Appl. No. 15/168,675 of Raanani, R., et al., filed May 31, 2016.
(Continued)

*Primary Examiner* — Thjuan K Addy
(74) *Attorney, Agent, or Firm* — Perkins Coie LLP

(57) ABSTRACT

A pattern recognition system ("system") automatically determines conversation patterns that distinguish a first set of participants from a second set of participants. For example, a first set of participants can be top performing representatives and the second set of participants can be low performing representatives. The system analyzes a first set of recordings of the top performing representatives to extract a first set of features associated with the first set of recordings, and analyzes the first set of features to generate first pattern data that is indicative of a pattern of the conversation of the top performing representatives. Similarly, the system also generates second pattern data that is indicative of a pattern of the conversation of the low performing representatives. The system analyzes the first pattern data and the second pattern data to generate distinctive features that distinguish the first pattern from the second pattern.

35 Claims, 13 Drawing Sheets

Related U.S. Application Data

(60) Provisional application No. 62/169,456, filed on Jun. 1, 2015, provisional application No. 62/169,445, filed on Jun. 1, 2015.

(51) Int. Cl.

| | | |
|---|---|---|
| *H04M 3/51* | (2006.01) | |
| *G06Q 30/02* | (2012.01) | |
| *G06F 17/27* | (2006.01) | |
| *G10L 15/18* | (2013.01) | |
| *G06Q 10/10* | (2012.01) | |
| *G06N 7/00* | (2006.01) | |
| *G06N 99/00* | (2010.01) | |
| *G10L 17/02* | (2013.01) | |
| *G10L 25/51* | (2013.01) | |
| *G10L 25/63* | (2013.01) | |
| *G10L 17/26* | (2013.01) | |

(52) U.S. Cl.
CPC ............ *G06N 7/005* (2013.01); *G06N 99/005* (2013.01); *G06Q 10/107* (2013.01); *G06Q 30/0281* (2013.01); *G10L 15/1815* (2013.01); *G10L 15/1822* (2013.01); *G10L 17/02* (2013.01); *H04M 3/5232* (2013.01); *G10L 17/26* (2013.01); *G10L 25/51* (2013.01); *G10L 25/63* (2013.01); *H04M 3/42221* (2013.01); *H04M 2201/40* (2013.01); *H04M 2203/357* (2013.01); *H04M 2203/556* (2013.01)

(58) Field of Classification Search
USPC .............. 379/265.07, 265.05, 265.06, 266.1, 379/265.03, 265.11, 265.12
See application file for complete search history.

(56) References Cited

U.S. PATENT DOCUMENTS

| | | | |
|---|---|---|---|
| 7,487,094 | B1 | 2/2009 | Konig et al. |
| 7,729,916 | B2 | 6/2010 | Coffman et al. |
| 8,165,886 | B1 | 4/2012 | Gagnon et al. |
| 8,346,563 | B1 | 1/2013 | Hjelm et al. |
| 8,914,285 | B2 | 12/2014 | Pollak et al. |
| 9,635,178 | B2 | 4/2017 | Raanani et al. |
| 9,900,436 | B2 | 2/2018 | Raanani et al. |
| 2004/0098274 | A1 | 5/2004 | Dezonno et al. |
| 2004/0249632 | A1 | 12/2004 | Chacon |
| 2005/0197841 | A1 | 9/2005 | Al-Dhubaib et al. |
| 2007/0038499 | A1 | 2/2007 | Margulies et al. |
| 2007/0265850 | A1 | 11/2007 | Kennewick et al. |
| 2008/0103781 | A1 | 5/2008 | Wasson et al. |
| 2008/0140415 | A1 | 6/2008 | Shostak |
| 2009/0150156 | A1 | 6/2009 | Kennewick et al. |
| 2009/0222313 | A1 | 9/2009 | Kannan et al. |
| 2012/0072254 | A1 | 3/2012 | McLean et al. |
| 2014/0025376 | A1 | 1/2014 | Wasserblat et al. |
| 2014/0086402 | A1 | 3/2014 | Kan et al. |
| 2014/0270133 | A1 | 9/2014 | Conway et al. |
| 2014/0317030 | A1 | 10/2014 | Shen et al. |
| 2015/0201077 | A1 | 7/2015 | Konig et al. |
| 2015/0237213 | A1 | 8/2015 | Spottiswoode et al. |
| 2015/0242860 | A1 | 8/2015 | Kannan et al. |
| 2015/0254675 | A1 | 9/2015 | Kannan et al. |
| 2015/0256675 | A1 | 9/2015 | Sri et al. |
| 2015/0348570 | A1 | 12/2015 | Feast et al. |
| 2016/0225372 | A1 | 8/2016 | Cheung et al. |
| 2016/0352902 | A1 | 12/2016 | Levy et al. |
| 2016/0352907 | A1 | 12/2016 | Levy et al. |
| 2017/0187880 | A1 | 6/2017 | Raanani et al. |

OTHER PUBLICATIONS

Co-Pending U.S. Appl. No. 15/168,729 of Raanani, R., et al., filed May 31, 2016.
Corrected Notice of Allowability dated Mar. 21, 2017 of U.S. Appl. No. 15/168,729 of Raanani, R., et al., filed May 31, 2016.
Non-Final Office Action dated Oct. 20, 2016 of U.S. Appl. No. 15/168,729 of Raanani, R., et al., filed May 31, 2016.
Notice of Allowance dated Feb. 14, 2017 of U.S. Appl. No. 15/168,729 of Raanani, R., et al., filed May 31, 2016.
Non-Final Office Action dated Jan. 24, 2018 of U.S. Appl. No. 15/168,675 by Raanani, R., et al., filed May 31, 2016.
Notice of Allowance dated Dec. 19, 2017 of U.S. Appl. No. 15/460,931 by Raanani, R., et al., filed Mar. 16, 2017.
Non-Final Office Action dated Nov. 16, 2017 of U.S. Appl. No. 15/460,931 by Raanani, R., et al., filed Mar. 16, 2017.
Notice of Allowance dated May 4, 2018 of U.S. Appl. No. 15/168,675 by Raanani, R., et al., filed May 31, 2016.
U.S. Appl. No. 16/017,646 of Raanani, R. et al. filed Jun. 25, 2018.

* cited by examiner

AUTOMATIC PATTERN RECOGNITION IN CONVERSATIONS

CROSS-REFERENCE TO RELATED APPLICATION(S)

This application is a continuation-in-part of U.S. application Ser. No. 15/168,675 titled "MODELING VOICE CALLS TO IMPROVE AN OUTCOME OF A CALL BETWEEN A SALES REPRESENTATIVE AND A CUSTOMER" filed May 31, 2016, which claims the benefit of U.S. Provisional Application Ser. No. 62/169,456 titled "MODELING VOICE CALLS TO IMPROVE AN OUTCOME OF A CALL BETWEEN A SALES REPRESENTATIVE AND A CUSTOMER" filed Jun. 1, 2015, and U.S. Provisional Application Ser. No. 62/169,445 titled "COORDINATING VOICE CALLS BETWEEN SALES REPRESENTATIVES AND CUSTOMERS TO INFLUENCE AN OUTCOME OF THE CALL" filed Jun. 1, 2015, all of which are incorporated herein by reference for all purposes in their entirety.

BACKGROUND

With over 2.4 million non-retail inside sales representatives in the United States (U.S.) alone, millions of sales phone conversations are made on a daily basis.[i] However, except for rudimentary statistics concerning e.g., call length and spotted keywords and phrases, sales conversations are left largely unanalyzed, rendering their content inaccessible to modeling, and precluding the ability to optimize them for desired outcomes. Recent advances in automatic speech recognition (ASR) technologies, and specifically in large vocabulary continuous speech recognition (LVCSR), are for the first time enabling high-accuracy automatic transcription of conversations. At the same time, natural language processing (NLP) approaches to both topic modeling and world-knowledge modeling, have become much more efficient due to the

[i]Insidesales.com "Market size 2013" study availability of large, freely accessible natural language corpora (e.g., CommonCrawl), as well as freely available ontologies or "knowledge graphs" (e.g., DBpedia). Finally, recent research on affect identification applying machine learning (ML) has been able to successfully model subjective aspects of emotion and personality traits as perceived by listeners.

DETAILED DESCRIPTION

Figure 1:
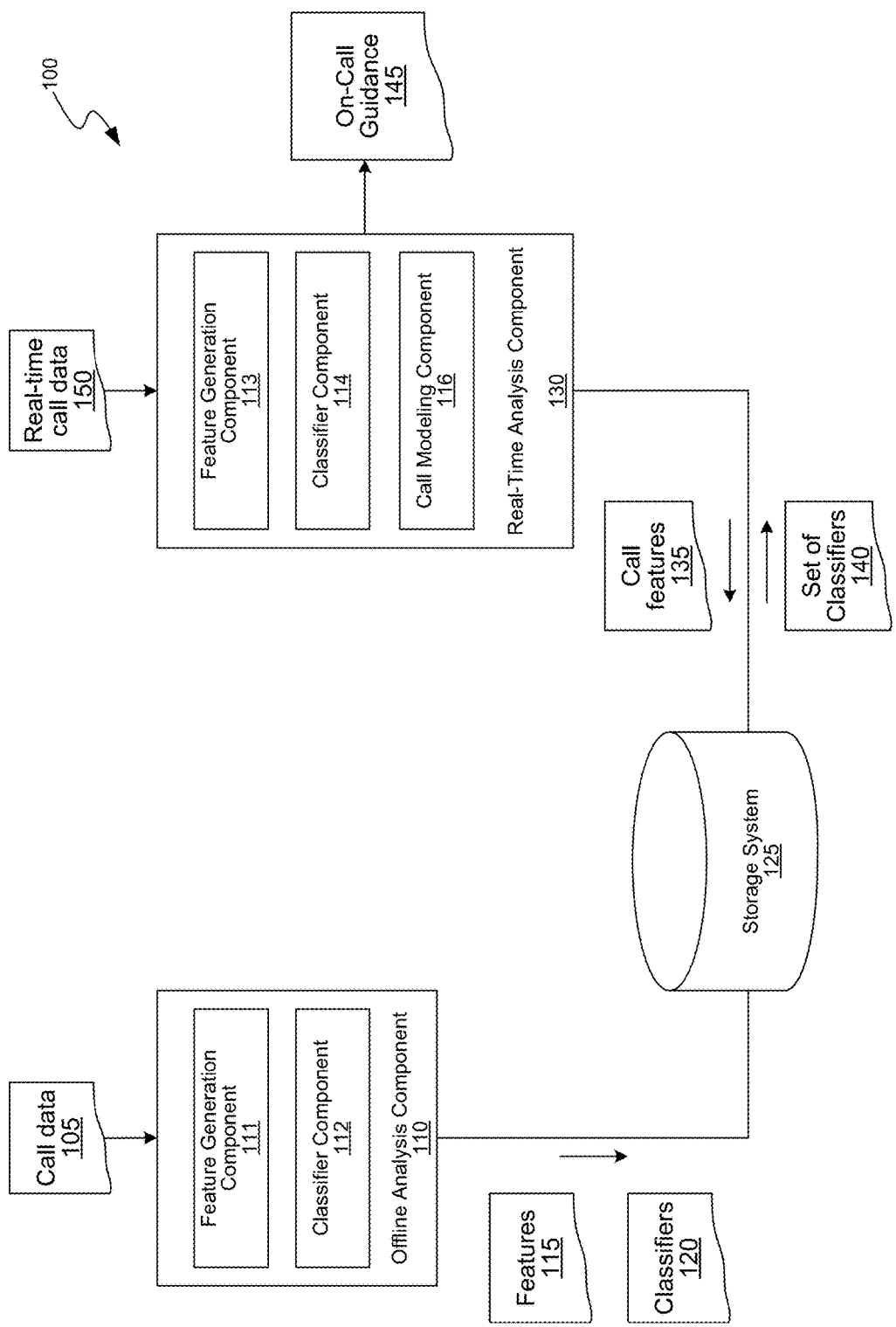
FIG. 1 is a block diagram of a call-modeling system in which the disclosed embodiments can be implemented.

Embodiments are disclosed for a call-modeling system for modeling conversations, e.g., voice conversations, in real time, with the goal of helping users, e.g., sales representatives and/or their managers, to improve and/or guide the outcome of conversations with other users, e.g., customers. One such embodiment can model the calls based on characteristics of the conversation, e.g., voice of the representatives and/or the customers, and content of the conversation, with the goal of positively influencing the outcome of the call. The call-modeling system can generate real-time probabilities for possible outcomes of a real-time conversation, e.g., an ongoing conversation between a specific representative and a customer, and generate specific on-call guidance, which may be either conducive or detrimental to a desired conversation outcome. The generated probabilities and on-call guidance may be used by the representatives and/or their managers to either increase the probability of a desired outcome and/or optimize the conversation for a specified duration if the predicted outcome is not going to be a desired outcome. For example, for renewing a magazine subscription, the call-modeling system can generate an on-call guidance suggesting a representative to engage in a rapport building exercise with the customer if it is determined that doing so increases the chances of the customer renewing the membership by 45%. On the other hand, if the call-modeling system predicts from the on-going conversation that the customer is not going to renew the subscription membership, then the call-modeling system can suggest the representative to wrap up the conversation as soon as possible.

The call-modeling system can include (i) an offline analysis component and (ii) a real-time analysis component. The offline analysis component can take as input conversations between a calling party, e.g., a customer, and a called party, e.g., a representative, and process the conversations using multiple distinct components to generate multiple features of the conversations. In some embodiments, the conversations can be audio recordings of calls between called party and the calling party (collectively referred to as "participants"). The features can include transcripts of audio recordings, vocabulary, semantic information of conversations, summarizations of utterances and various natural language entailments, summarization of a call, voice signal associated features (e.g., a speech rate, a speech volume, a tone, and a timber), emotions (e.g., fear, anger, happiness, timidity, fatigue), personality traits (e.g., trustworthiness, engagement, likeability, dominance, etc.), personal attributes (e.g., an age, an accent, and a gender), customer-representative pair attributes that indicate specific attributes associated with both the speakers that contribute to a specified outcome (e.g., similarity of speech rate between the representative and the customer, extrovert/introvert matching, or gender or age agreement).

Note that a recording of the conversation can be of a conversation that is any of telephone based, Voice over Internet Protocol (VoIP) based, video conference based, Virtual Reality (VR) based, Augmented Reality (AR) based, or based on any online meetings, collaborations or interactions, electronic mail (e-mail). The recording can also be of a conversation that has happened between two or more speakers physically located in the same room. In some embodiments, a recording based on any online meetings, collaborations or interactions, or email can be a transcript of the corresponding interaction.

Further, the features can include not only aural features, but also non-aural features, e.g., visual features such as body language of a participant, and facial expressions of the participant, or any combination of aural and non-aural features. The features could also be generated from the transcripts of any of emails, online messages, and online meetings. In some embodiments, any of a word, a phrase, a text, emoji, symbols, or a combination thereof can be used to determine a particular feature. For example, it can be determined that a text such as "Ha Ha" or "rofl" in the transcript can indicate laughter.

In some embodiments, the audio recordings can be tagged with various tags, e.g., a tag that indicates a trait (e.g., "extrovert", "trustworthy voice", "anxious", etc.) of one or more of the participants, a tag that indicates a call outcome (e.g., "sales closed", "sales failed", or "follow-up call scheduled"), and/or a tag that indicates "key moments" of a conversation. A "key moment" or a "moment" can be a specific event or a specific characteristic which occurs in the call. The event can be any event that is of specific interest for a specific application for which the call-modeling system is being implemented. An administrator of the call-modeling system can configure what events in a call have to be identified as a moment. For example, a moment can be laughter, engagement, fast-talking, open-ended questions, objections, or any combination thereof in a conversation. In some embodiments, the moments are identified automatically by a moment identification system. The tags can be generated automatically by the call-modeling system, manually, e.g., by human judgment, or both. In some embodiments, the tags are generated automatically by the call-modeling system. The tag can include various details, e.g., information regarding a moment, a time interval at which the moment occurred in the call, duration for which the moment lasted, information regarding the participants of the call, etc.

The moments can also be notified to and/or shared between the participants during an on-going conversation and/or after the conversation. For example, during a call between a customer and a representative, the call-modeling system can analyze the call, identify the moments in the conversation, and tag, notify and/or share the moments with the representative's manager, peers or other people. The shared moments can be used for various purposes, e.g., for coaching the representatives in handling the calls to improve outcomes of the calls based on various situations. The moments can be shared using various means, e.g., via email, a chat application, or a file sharing application.

In some embodiments, the offline analysis component uses distinct components to extract the features. The components can include an automatic speech recognition (ASR) component, which can produce a transcription of the conversation, a natural language processing (NLP) component, which can extract semantic information (such as open-ended questions asked, key objections, etc.) from the conversation, an affect component, which can analyze the recording for emotional signals and personality traits (e.g., likeability and trustworthiness), and a metadata component, which can extract data regarding conversation flow (i.e., who spoke when, and how much silence and overlap occurred).

The offline analysis component can analyze the features to generate one or more classifiers that indicate conversation outcomes, e.g., "sales closed", "sales failed." Each of the classifiers indicates a specific outcome and can include a set of features that contribute to the specific outcome. The offline analysis component can generate multiple classifiers for the same outcome; however, the multiple classifiers can have distinct sets of features. In some embodiments, the offline analysis component can analyze the features using a machine learning algorithm (e.g., a linear classifier, such as a support vector machine (SVM), or a non-linear algorithm, such as a deep neural network (DNN) or one of its variants) to generate the classifiers.

In some embodiments, the offline analysis component generates a classifier for different time intervals or time windows of the conversations. For example, the offline analysis component can analyze the extracted features for seconds 00:05-00:10 of a conversation, seconds 00:20-00:30, and minutes 1:00-2:00, and generate a classifier for each of those time windows. The offline analysis component feeds the extracted features into the machine-learning algorithm to produce multiple classifiers corresponding to the time windows. The time windows can be of varying lengths or fixed lengths. In some embodiments, the offline analysis component can generate classifiers for other relative positions of a conversation. For example, the offline analysis component can generate a classifier corresponding to an instance in the conversation, e.g., when a customer spoke for the first time in the conversation, and analyze features such as a pitch of the voice, a topic the customer spoke about first, and the length of the customer's first talk, to generate the classifier.

The real-time analysis component uses the classifiers to model a real-time conversation, e.g., an ongoing call between a representative and a customer, that helps the representative to increase a probability of a desired outcome of the conversation or optimize the conversation duration in case the real-time analysis component does not predict the desired outcome. The real time analysis component receives real-time call data of an ongoing conversation between the customer and a representative and analyzes the real-time call data to generate a set of features, e.g., using the offline analysis component as described above. The real-time analysis component can then feed the features to the classifiers to generate probabilities of potential outcomes of the call. The real-time analysis component can use the classifiers with highest prediction powers to generate the probabilities of various potential outcomes. In some embodiments, the real-time analysis component measures the prediction powers of the classifiers using an F-score, which, in statistical analysis, is a (possibly weighted) harmonic mean of precision and recall.

The real-time analysis component feeds the extracted features into the classifiers with high F-scores to generate probabilities of possible outcomes. Based on the probabilities, the real-time analysis component can also generate on-call guidance, which encourages the representative and/or their managers to modify, desist or persist with a specified on-call behavior to increase or decrease the probability of one of the possible outcomes, e.g., a desired outcome such as closing a sale. In some embodiments, the on-call guidance includes a set of suggested features and their values to be adopted, desisted or persisted with by the representative. For example, the on-call guidance can include instructions for the representative to change the rate of speech (e.g., speak slower), use specific key words, or pose more open-ended questions to the customer.

In some embodiments, the on-call guidance can change as the call progresses, e.g., based on the classifiers that are relevant to the call at that particular time of the conversation. For example, during the first two minutes of the call, a classifier that corresponds to the first two minutes of the call may be used to generate the on-call guidance such as instructing the representative to pose open-ended questions to the customer, and then in the third minute, a classifier that corresponds to the third minute of the call may be used to revise the on-call guidance, e.g., suggest to the representative to adjust the speech rate to match with that of the customer.

Additionally, if according to the classifiers, the real-time analysis component predicts the conversation to fail, the on-call guidance may suggest to the representative to quickly wrap up the call in order to spare the representative's time. The on-call guidance of the real-time analysis module may be presented on-screen or via any other interface (e.g., voice instructions given through an ear piece) to the representative and/or the manager. The embodiments can produce real-time probabilities of various outcomes of the conversations, enabling live coaching that can help the representatives in improving the outcomes of the conversations in real-time.

Embodiments are also disclosed for automatically determining conversation patterns that distinguish a first set of participants from a second set of participants. For example, a first set of participants can be top-performing representatives and the second set of participants can be non-top performing representatives or low-performing representatives. A pattern recognition system analyzes a first set of recordings of the first set of participants to extract a first set of features associated with the first set of recordings, and analyzes the first set of features to generate first pattern data that is indicative of a pattern of the conversation of the first set of representatives. Similarly, the pattern recognition system also generates second pattern data that is indicative of a pattern of the conversation of the second set of representatives. The pattern recognition system analyzes the first pattern data and the second pattern data to determine distinctive features that distinguish the first pattern data from the second pattern data. In some embodiments, the pattern recognition system determines that a feature is distinctive if the difference between a first value associated with a specified feature in the first pattern data and a second value associated with the specified feature in the second pattern data exceeds a specified threshold. For example, the pattern recognition system can determine the usage of a vocabulary feature, e.g., collaborative language such as the usage of "we", "us" and "together" used by a sales representative to discuss a challenge the sales representative and the customer (or prospect) face, versus factional and divisive language such as using "I" and "you" to describe the sales representative and the prospect, respectively, as a separating vocabulary feature by the two sets of representatives. Continuing with the example, the pattern recognition system can determine that the occurrence of 2-word phrases having collaborative language such as "we could," "we can," "work together," or "we will" is 20% of the total 2-word phrases used by the first set of representatives vs. 10% of the total 2-word phrases used by the second set of representatives. Similarly, the pattern recognition system can determine that the occurrence of 2-word phrases having factional language such as "I can," "I was" "I like" or "you can" "you should" is 8% of the total 2-word phrases used by the first set of representatives vs. 35% of the total 2-word phrases used by the second set of representatives. That is, the pattern recognition system can determine that the top-performing representatives were more likely to use the collaborative language "we" when conversing with customers or prospects vs. low-performing representatives, who tend to use "you" and "I." In the above example, the top-performing representatives are at least 2 times more likely to use the collaborative language than low-performing representatives, and the low-performing representatives are at least 4 times more likely to use the factional language than top-performing representatives.

The pattern recognition system can be used for various purposes. For example, the pattern recognition system can be used to determine how the top-performing representatives differ from the low-performing representatives and coach the low-performing representatives accordingly to perform better. While the above example is illustrated with reference to top-performing and low-performing representatives, the embodiments can be used for determining conversation pattern of various sets of representatives, e.g., male representatives vs. female representatives, manager representatives vs. sub-ordinate representatives, a first age-range representatives vs. a second age-range representatives, conversations with a positive outcome, e.g., won deals, vs. conversation with a negative outcome, e.g., lost deals.

The pattern recognition system is not restricted to determining conversation patterns that distinguish two sets of representatives, the pattern recognition system can determine conversation patterns that distinguish more than two sets of representatives. For example, to distinguish conversation pattern of three sets of representatives, the pattern recognition system can generate three sets of pattern data, one for each set of representatives. The pattern recognition system can then compare the pattern data with one another to determine the distinguishing features. For example, the pattern recognition system can compare the second pattern data corresponding to the second set of representatives and the third pattern data corresponding to the third set of representatives with the first pattern data to determine distinctive features of the conversation patterns between the first set of representatives and the second set of representatives, and between the first set of representatives and the third set of representatives.

Further, the distinctive feature is not restricted to one feature. There can be more than one distinctive feature between the first pattern data and the second pattern data. In some embodiments, the distinctive feature can be a combination of two or more features. For example, the pattern recognition systems can identify two separating features, the first being the "collaborative language" feature and the second one being that top-performing representatives set more action items and start setting them earlier in the conversation compared with low-preforming reps that set less action items on average and set them only towards the end of the conversation. The threshold for considering a feature as distinctive can be based on a value associated with a single feature, or based on a value associated with a combination of features. Continuing with the above example, values associated with a combination of features may be used to determine whether the combination of features—usage of collaborative language feature and the setting of action items feature—is distinctive. For example, a value associated with the above combination of features can be determined as a function of (X, Y), where X is a number of collaborative phrases and Y is a number of action items. The combination of features is said to be distinctive if the value associated with the combination of features exceeds a threshold "Z", that is, if f(X,Y)>Z. The function f(X,Y) could be any of various possible functions, e.g., (X+Y) or X/total number of words+Y/length of conversation.

The thresholds for considering a feature as distinctive can be user-defined or determined by the pattern recognition system, e.g., using artificial intelligence (AI) or machine learning (ML) techniques. For example, at least one of the threshold "Z" or the function f(X,Y) is determined using AI or ML techniques. Further, in some embodiments, the pattern recognition system can also adjust a specified threshold, e.g., using AI and ML techniques.

The distinctive features between the first pattern data and the second pattern data are not restricted to a predetermined set of features. The pattern recognition system can learn of the distinguishing features. For example, the pattern recognition system can employ AI or ML techniques to learn, derive and/or determine new distinguishing features between the first pattern data and the second pattern data, e.g., features that were not identified in prior analysis or that are not in the predetermined or user-defined set of features.

Turning now to FIG. 1, FIG. 1 is a block diagram of a call-modeling system 100 in which the disclosed embodiments can be implemented. The call-modeling system 100 includes an offline analysis component 110 and a real-time analysis component 130. The offline analysis component 110 can take as input historical call data 105, which includes conversations between participants, e.g., audio recordings of calls between representatives and customers, and process the call data 105 using multiple components to generate features 115 of the conversations, and classifiers 120.

The offline analysis component 110 includes a feature generation component 111 that generates features 115 by analyzing the call data 105 using various techniques, e.g., ASR, NLP, artificial intelligence (AI), machine learning (ML). The features 115 can include transcripts of audio recordings, vocabulary, semantic information of conversations, summarization of a call, summarizations of utterances and various natural language entailments, voice signal associated features (e.g., speech rate, speech volume, tone, and timber), emotions (e.g., fear, anger, happiness, timidity, fatigue), personality traits (e.g., trustworthiness, engagement, likeability, dominance, charisma, confidence, etc.), personal attributes (e.g., age, accent, and gender), and inter-speaker attributes that indicate a comparison between both the speakers (e.g., similarity of speech rate between the representative and the customer, extrovert/introvert matching, or gender or age agreement). Further, the features can include not only aural features, but also non-aural features, e.g., visual features such as body language of a participant, and facial expressions of the participant, or any combination of aural and non-aural features.

The classifier component 112 analyzes the features 115 using various techniques, e.g., machine learning algorithms such as SVM, DNN, to generate the classifiers 120. The classifiers 120 indicate conversation outcomes, e.g., "sales closed", "sales failed," "probability of recommending to a friend," a measure of "customer satisfaction," and Net Promoter Score (NPS). An outcome can have binary values, e.g., "yes/no", "high/low", or non-binary values, e.g., a probability score, enumerated values like "low, average, medium, high, very high," values on a scale of 0-10, etc. For example, an outcome such as customer satisfaction can be measured using binary values such as "low/high", or using non-binary values, such as a scale of 0-10, enumerated values. Each of the classifiers indicates a specific outcome, a probability of the specified outcome and can include a set of the features that contributed to the specific outcome. For example, in a sales call for renewing a magazine subscription, a classifier "C1" can indicate that when laughter by a customer and two open-ended questions from the representative are registered, there is a high chance, e.g., 83%, of renewal.

In some embodiments, the classifier component 112 generates different classifiers for different time windows of the conversations. For example, the classifier component 112 generates a classifier "C1" for the first two minutes of the conversations and a classifier "C2" for a third minute of the conversations. The classifier "C1" based on the first two minutes of the conversation can indicate that when laughter by a customer and two open-ended questions from the representative is registered, there is a high chance, e.g., 83%, of renewal. The classifier "C2" based on the third minute of the conversation can indicate that when a competitor magazine or the key-phrase "read online" is used, the renewal chances drop to 10%, all of which can occur if customer's speech rate drops below three words per second. Some of the classifiers include features for inter-speaker attributes that indicate a comparison between the speakers that contribute to a specified outcome (e.g., similarity of speech rate between the representative and the customer, extrovert/introvert matching, or gender or age agreement).

The features, when extracted from the conversations, can include attributes and values. The classifier determines what values of the features influence a particular outcome of the call. The classifiers 120 can be generated in various formats and is not limited to the above illustrated example format. The classifier component 112 can generate multiple classifiers for the same outcome; however, the multiple classifiers can have distinct sets of features. Further, as described above, the classifier component 112 can generate different classifiers for different time windows of the conversation. The offline analysis component 110 can store the features 115 and the classifiers 120 in a storage system 125.

The call-modeling system 100 includes a real-time analysis component 130 that uses the classifiers 120 to generate on-call guidance for both inbound and outbound calls that will help the representative optimize the call for a desired outcome, or optimize the call duration if the desired outcome is not predicted (i.e., very low chances of the desired outcome are predicted). The real-time analysis component 130 receives real-time call data 150 of an ongoing conversation between a customer and a representative and analyzes the real-time call data 150 to generate a set of features, e.g., call features 135, for the ongoing conversation using a feature generation component 113. In some embodiments, the feature generation component 113 is similar to or the same as the feature generation component 111. The feature generation component 113 generates the call features 135 based on the real-time call data 150, e.g., as described above with respect to the feature generation component 111. The real-time call data 150 can be an early-stage or initial conversation between the customer and the representative.

After the call features 135 are generated, a classifier component 114, which, in some embodiments, is the same as, or similar to the classifier component 112, inputs the call features 135 to the classifiers 120 to determine a set of classifiers 140 that predict possible outcomes of the call based on the call features 135. Each of the set of classifiers 140 indicates a specified outcome of the call and an associated probability of the corresponding outcome. In some embodiments, the classifier component 114 chooses classifiers that have the highest prediction power, which can be measured using an F-score, as the set of classifiers 140. After the set of classifiers 140 are determined, a call-modeling component 116 generates an on-call guidance 145 that includes real-time probabilities of possible outcomes of the call as indicated by the set of classifiers 140. The call-modeling component 116 can further analyze the set of classifiers 140 to determine features that have high prediction power, e.g., prediction power exceeding a specified threshold, for predicting a desired outcome, and include those features and values associated with those features in the on-call guidance 145. The on-call guidance 145 notifies the representative to adopt, desist or persist with an on-call behavior consistent with those features to achieve the desired outcome, or to increase the probability of achieving the desired outcome. If the set of classifiers 140 predict that the desired outcome may not be achieved, the call-modeling component 116 may suggest, in the on-call guidance 145, that the representative wrap up the call.

The call data 105 can be in various formats, e.g., audio recordings, transcripts of audio recordings, online chat conversations. Similarly, the real-time call data 150 can be in various formats, e.g., real-time audio stream of the call, a chat transcript of an ongoing conversation in an online chat application. Further, the real-time call data 150, which can include an initial or early stage conversation, can be a conversation between the customer and an automated machine, e.g., an interactive voice response (IVR) system, or a representative for gathering preliminary information from the customer that can be useful for generating the on-call guidance.

In some embodiments, the call-modeling system 100 includes a search tool that empowers a consumer user to explore various aspects of a conversation. For example, the search tool allows the consumer user to search for anything that came up on the call, e.g., both linguistic and meta-linguistic. The search tool can be used to further analyze the conversation, extract appropriate features and use them to improve the classifiers in predicting the outcome of the calls. For example, the search tool can be used to find calls that registered a laughter from the customer, calls in which the customer spoke for the first time after a specified number of minutes, calls in which the customer sounded angry, calls in which customer mentioned competitors, calls in which the representatives engaged in rapport building, calls in which the representative modulated speech rates at various instances of the call, calls in which short or open-ended questions were asked at a high frequency, or any combination of the above.

Figure 2:
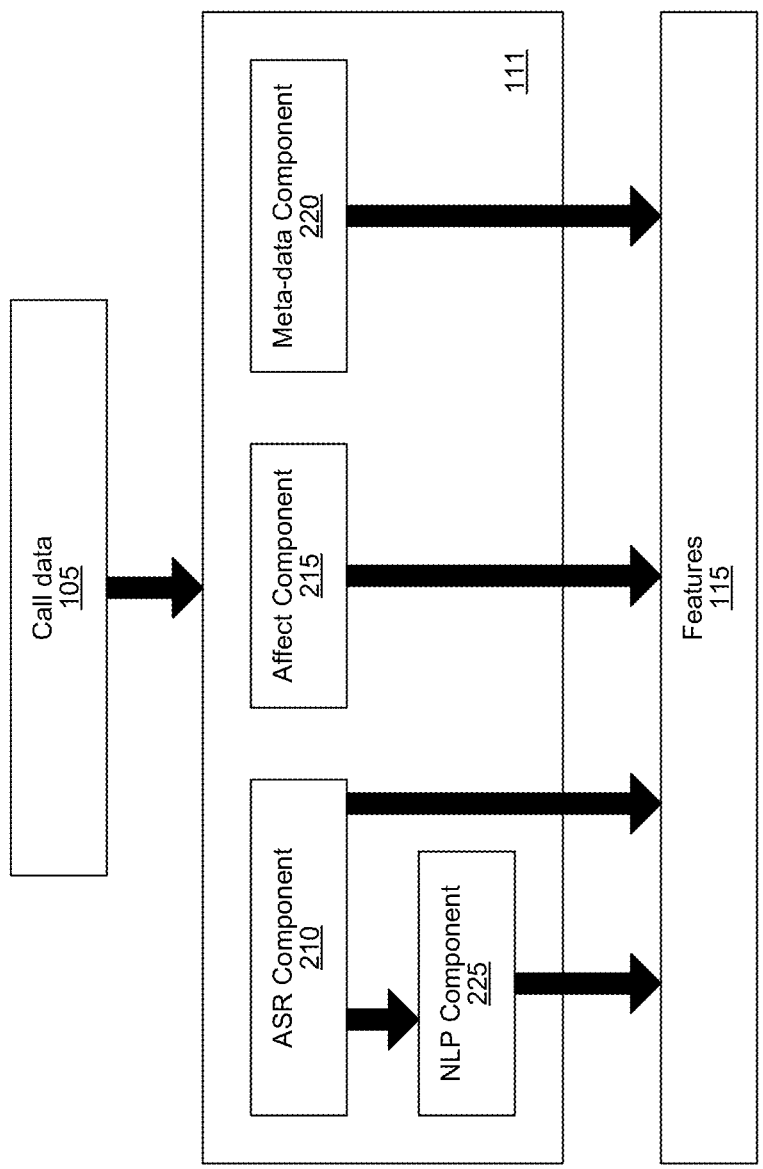
FIG. 2 is a block diagram of a feature generation component of the call-modeling system for extracting features from call data, consistent with various embodiments.

FIG. 2 is a block diagram of a feature generation component of FIG. 1 for extracting features from call data, consistent with various embodiments. In some embodiments, the feature generation component 111 includes an ASR component 210, an NLP component 225, an affect component 215 and a metadata component 220. The ASR component 210 can analyze call data 205, e.g., a voice recording, and produce a transcription, vocabulary, and a language model of the conversation. The NLP component 225 can extract semantic information, such as key objection handling responses, from the output of the ASR component 210. The affect component 215 can analyze the call data 205 for emotional signals and personality traits (e.g., likeability, extroversion/introversion, charisma, confidence, and trustworthiness) as well as general personal attributes such as gender, age, and accent of the participants. The metadata component 220 can extract data regarding conversation flow (e.g., who spoke when, and how much silence and overlap occurred). In some embodiments, the above components can process the call data 105 in parallel. The output of the components can be generated as features 115 of the conversations, which can be analyzed to determine outcomes of the conversations.

The ASR component 210 may be tuned for specific applications, e.g., for sales calls. The features produced by the ASR component 210 may include full transcripts, vocabularies, statistical language models (e.g., transition probabilities), histograms of word occurrences ("bag of words"), weighted histograms (where words are weighted according to their contextual salience, using e.g., a Term Frequency-Inverse Document Frequency (TF-IDF) scheme), n-best results, or any other data available from the component's lattice, such as phoneme time-stamps, etc. The ASR component 210 may also be used to extract meta-linguistic features such as laughter, hesitation, gasping, background noise, etc. The ASR features can be extracted separately for the representative and the customer, and may be recorded separately for multiple speakers on each side of the conversation.

The NLP component 225 processes the text to produce various semantic features, e.g., identification of topics, identification of open-ended questions, identification of objections and their correlation with specific questions, named entity recognition (NER), identification of relations between entities, identification of competitors and/or products, identification of key phrases and keywords (either predetermined, or identified using salience heuristics such as TF-IDF), etc. Additional features that may be extracted by the NLP component 225 can be summarizations of utterances and various natural language entailments. The NLP features can be extracted separately for the representative and the customer, and may be recorded separately for multiple speakers on each side of the conversation.

The affect component 215 can extract low-level features and high-level features. The low-level features can refer to the voice signal itself and can include features such as speech rate, speech volume, tone, timber, range of pitch, as well as any statistical data over such features (e.g., maximal speech rate, mean volume, duration of speech over given pitch, standard deviation of pitch range, etc.). The high-level features can refer to learned abstractions and can include identified emotions (e.g., fear, anger, happiness, timidity, fatigue, etc.) as well as perceived personality traits (e.g., trustworthiness, engagement, likeability, dominance, charisma, confidence, etc.) and perceived or absolute personal attributes such as age, accent, and gender. Emotion identification, personality trait identification, and personal attributes, may be trained independently to produce models incorporated by the affect component, or trained using the human judgment tags optionally provided to the offline analysis component. In some embodiments, the affect component 215 can also extract features, such as a speaker engagement metric ("wow" metric), which measures how engaged a participant was in the conversation, e.g., based on the usage of vocabulary, rate of speech, pitch change. For example, the usage of phrase "Oh! cool" can indicate a higher degree of engagement than the phrase "cool!". In another example, the same phrase but said in different pitches or pitch ranges can indicate different degrees of engagement. All features extracted by the affect component 215 may or may not include a corresponding confidence level, which can be used in modeling outcomes. The affect features can be extracted separately for the representative and the customer, and may be recorded separately for multiple speakers on each side of the conversation.

The metadata component 220 can measure conversation flow, including speaker diarisation (e.g., which speaker spoke when and for how long), silence times and duration, as well as overlap of two or more speakers in addition to other metadata such as time of day call was placed, geographical destination of call and known gender and age of participants. The data extracted with the metadata component 220 may be collected separately for multiple speakers on each side of the conversation, or pooled together for representative and customer sides, respectively.

All components may extract features for a group of representatives, a single representative and/or a customer, including multiple parties on either side, and may be customized to optimize feature extraction accordingly. In addition, the features 115 may be extracted on the representative's recording alone, on the customer's recording alone, or on both. The features 115 may also include comparisons between extracted attributes. For example, the affect component 215 may extract as a feature a mean difference between representative and customer's speech rates, or a maximum difference between representative and customer's speech pitches. Likewise, the ASR component 210 may extract transcriptions and keywords both as a combined transcript and as two separate transcripts, and may be tuned with an acoustic or language model specific to a group of representatives or an individual representative. Similarly, the NLP component 225 may extract features such as open-ended questions with or without the corresponding response.

In some embodiments, the feature generation component 111 can also generate a set of features that indicate a blueprint of a conversation. The blueprint can represent a skeleton of the conversation and indicate a presence or absence of a particular aspect in the conversation. For example, the blueprint can include various features that indicate whether the conversation included any agenda setting, rapport building, clarification questions, defining goals, setting expectations, mentioning of examples. The blueprint can also help in predictive analysis of the outcome of the calls, e.g., by the classifier component 112. One or more components of the feature generation component 111 can use AL and/or ML techniques to extract one or more of the features 115.

Figure 3:
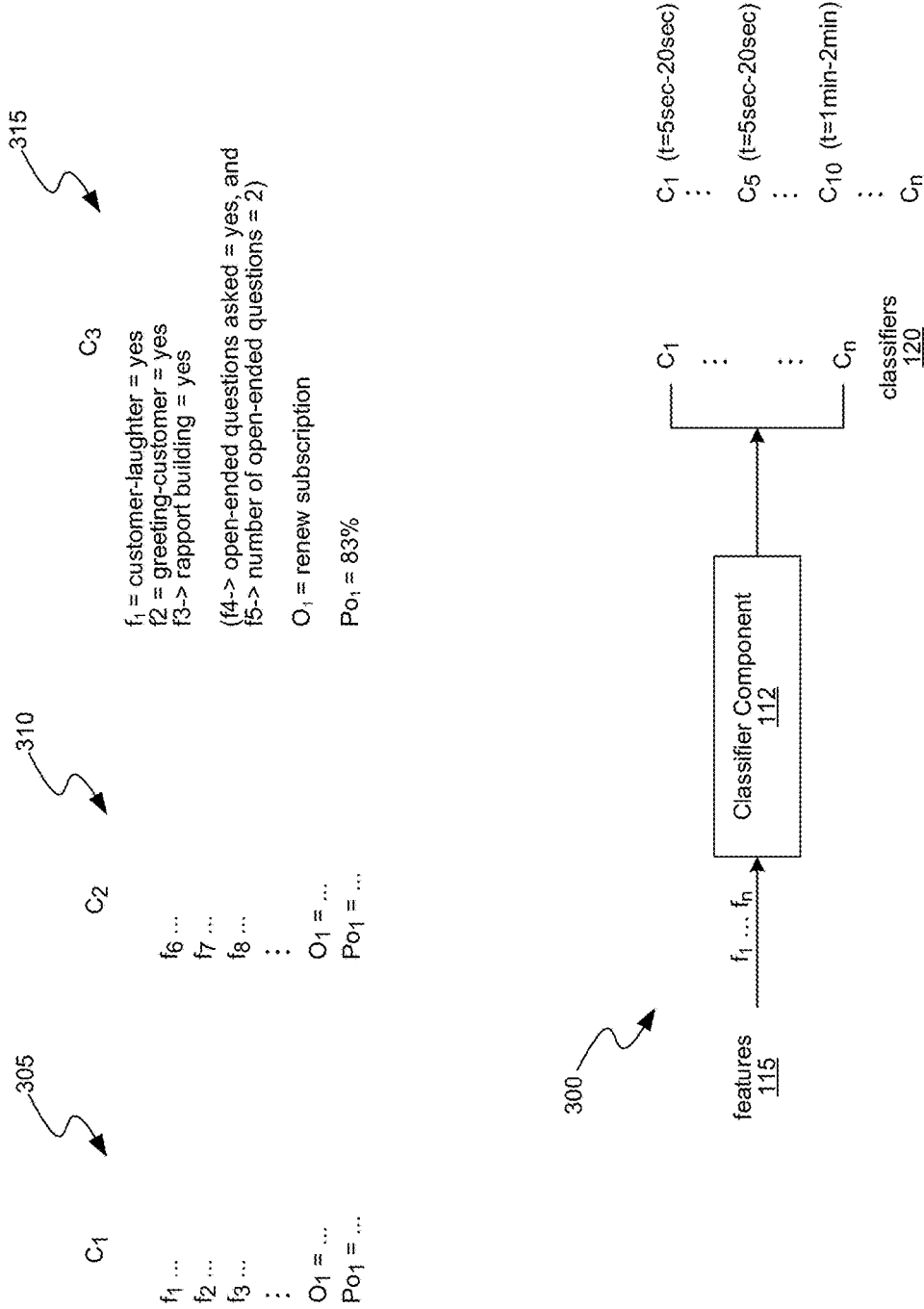
FIG. 3 is a block diagram of a classifier component of the call-modeling system for generating classifiers, consistent with various embodiments.

FIG. 3 is a block diagram of the classifier component for generating classifiers, consistent with various embodiments. The example 300 illustrates the classifier component 112 using the features 115 extracted from the feature generation component 111 to generate a number of classifiers, "C1"- "CN". In some embodiments, the classifier component 112 analyzes the features of a dedicated portion of the collected recordings, e.g., a training set, which is a subset of the entire recordings available for analysis, to generate the classifiers 120. Each of the classifiers 120 can have a value, e.g., an F-score, that indicates a prediction power of the classifier for the specified outcome. The higher the prediction power, the higher the probability of achieving the specified outcome of the classifier based on the included features. In some embodiments, the prediction power is determined by running the classifiers 120 on, e.g., a portion of call recordings that is not yet analyzed, e.g., a test set, and computing the respective F-score.

The classifiers 120 may be further analyzed to determine what features carry the largest prediction power, e.g., speech rate early in the conversation, occurrence of first interrupt by customer, names of competitors mentioned, or number of open questions thoughtfully answered, and a subset of these classifiers that have features with the largest prediction power can be used to generate the on-call guidance.

The conversation outcome depicted by the classifiers 120 can be any configurable outcome, e.g., "sales closed", "sales failed", "demo scheduled", "follow up requested," NPS-like probability of recommending to a friend, etc. In some embodiments, the features 115 extracted from the feature generation component 111 can be fed into a machine learning algorithm (e.g., a linear classifier, such as a SVM, or a non-linear algorithm, such as a DNN or one of its variants) to produce the classifiers 120. The classifiers may be further analyzed to determine what features carry the largest prediction powers (e.g., similarity of speech rate, occurrence of first interrupt by customer, extrovert/introvert matching, or gender or age agreement.)

The classifier component 112 can generate multiple classifiers for the same outcome. However, for a given outcome, different classifiers have different features. For example, the classifier component 112 can generate a first classifier 305, "C1," and a second classifier 310, "C2," for a specified outcome, "O1." However, the first classifier "C1" has a first set of features, e.g., features "f1"-"f3," and the second classifier "C2" has a second set of features, e.g., features "f5"-"f8." The features in different classifiers can have different prediction powers and contribute to the specified outcome in different degrees.

Different classifiers may be built for a different number of participants, and may consider multiple participants as a single interlocutor, or as distinct entities. Further, as described above, the classifier component 112 can generate different classifiers for different time intervals of a conversation. The classifier component 112 analyzes the features 115 extracted from the feature generation component 111 at various time intervals, e.g., seconds 00:05-00:10, seconds 00:20-00:30, minutes 1:00-2:00, covering the entire conversation duration, and generates one or more classifiers for each of those time intervals. Each classifier can correspond to a specified time interval of the conversation. For example, if "100" conversations are being analyzed, then the classifier component 112 can analyze first 5-20 seconds each of the "100" conversations and generate one or more classifiers for all the conversations corresponding to the interval of 5-20 seconds. Similarly, it can generate one or more classifiers corresponding to the 10-25 seconds interval. If more than one classifier is generated for a specified time interval, in some embodiments, different classifiers can have different outcomes, and in some embodiments, can have the same outcome; however, different classifiers will have different sets of features that contribute to the corresponding outcome. In the example 300, classifiers C1 and C5 correspond to a time window of seconds 00:05-00:20 of the conversations analyzed, and classifier C10 corresponds to minute 1:00-2:00 of the conversations.

The classifier 315, "C3," includes an example set of features extracted from analyzing various sales calls. The classifier 315 corresponds to the first two minutes of the conversations, and indicates that when laughter from the customer is registered and the representative greets the customer, indulges in rapport building and poses at least two open-ended questions, then there is a high chance, e.g., 83%, of renewal of a magazine subscription. The features and outcome of the classifier 315 "C3" can be "f1→customer laughter=yes" "f2→greeting customer=yes," "f3→rapport building=yes," ("f4→open ended questions asked=yes," and "f5→number of open ended questions asked=2"), "outcome=renew subscription" "probability of outcome=83%."

Figure 4:
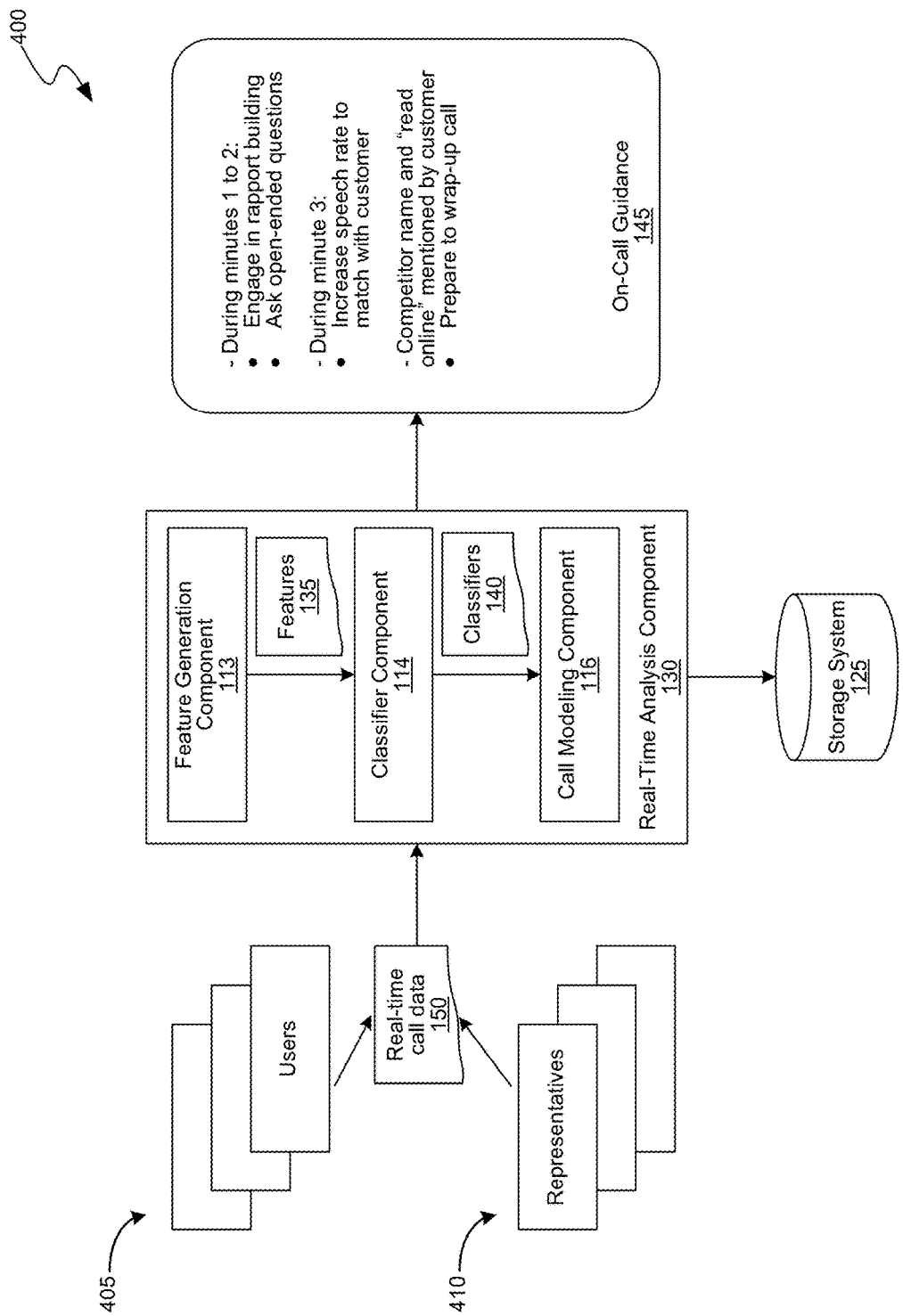
FIG. 4 is a block diagram of a real-time analysis component of the call-modeling system for generating on-call guidance for a representative during a call between the representative and a customer, consistent with various embodiments.

The classifiers 120 can be used by the real-time analysis component 130, e.g., as described at least with reference to FIG. 1 above and FIG. 4 below, to generate an on-call guidance for representatives or both inbound and outbound calls. FIG. 4 is a block diagram of the real-time analysis component of FIG. 1 for generating on-call guidance for a representative during a call between the representative and a customer, consistent with various embodiments. In some embodiments, the real-time analysis component 130 takes as input a live conversation stream, e.g., real-time call data 150, between a representative 410 and a customer 405, uses the feature generation component 113 to extract call features 135, e.g., as described above at least with reference to FIGS. 1 and 3.

The classifier component 114 feeds the call features 135 into the classifiers 120 generated by the offline analysis component 110 and selects a subset of the classifiers 120, e.g., a set of classifiers 140, that includes features that match with the call features 135 extracted from the live conversation stream. In some embodiments, the set of classifiers 140 chosen by the call-modeling component 116 are also the classifiers that have high predictability power, e.g., as measured using an F-score and that have an F-score exceeding a specified threshold.

The call-modeling component 116 then generates an on-call guidance 145, which includes information regarding real-time probabilities for specific outcomes to which the set of classifiers 140 correspond. The on-call guidance 145 may be used to notify the representative and/or their managers of the predicted outcome of the call. Additionally, the call-modeling component 116 can further analyze the set of classifiers 140 to determine classifiers that include features with the largest prediction powers, and present the values of those features in the on-call guidance 145 for suggesting the representative and/or their managers to modify or persist with an on-call behavior consistent with those features. For example, if one of the set of classifiers 140 predicts that conversations with rapport building and several open-ended questions being posed at the first few minutes of the conversation lead to favorable outcomes, the call-modeling component 116 may notify the representative and/or their managers as part of the on-call guidance 145 to engage in rapport building and pose questions at early stages of the conversation. Similarly, if one of the classifiers from the set of classifiers 140 indicates that matching speech rate to within 10% of customer's rate at a specified relative position of the call, e.g., during third minute of the call, leads to improved closing results, the call-modeling component 116 may notify the representative and/or their managers as part of the on-call guidance 145 to adjust their speech rate accordingly. On the other hand, if one of the classifiers from the set of classifiers 140 indicates that conversations beginning with over a specified number of objections, naming a specific competitor and mention of the phrase "read online" do not lead to good results, the call-modeling component 116 may notify the representative and/or their managers as part of the on-call guidance 145 to expedite wrap-up of conversations to avoid losing time on a call that is not likely to yield desired results.

In addition to live on-call guidance, the real-time analysis component 130 may be used to provide the representative and/or their managers with non-real time analysis as well, which provides insight into details of the conversations, e.g., what occurred in the conversations, when events occurred, and various such quantifiable analytics of the calls. For example, the classifiers can be used to find interesting calls that would interest the representatives to listen and learn from. The disclosed embodiments can be used to improve outcomes of the call not only during a real-time or a live call, but could also be used to inform representatives and/or managers for better training and coaching in retrospect.

The real-time analysis component 130 may also be used to auto-populate information fields in a customer relationship management (CRM) system or a similar system.

Figure 5:
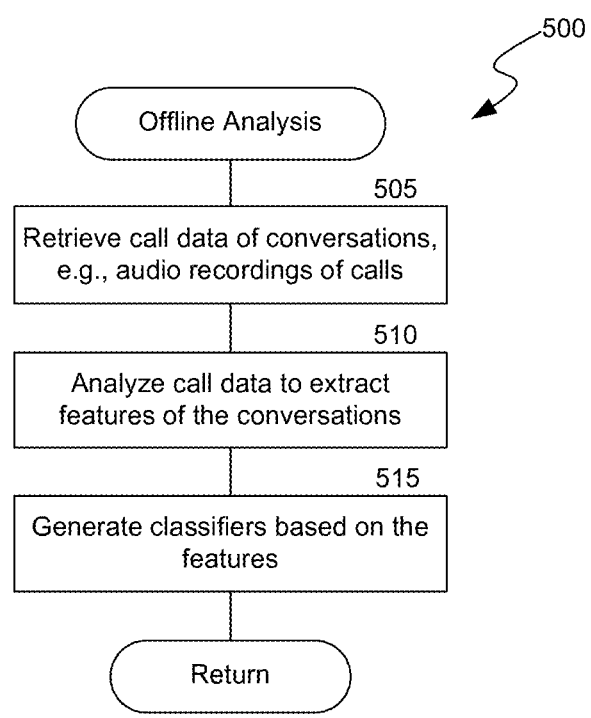
FIG. 5 is a flow diagram of a process for performing offline analysis of conversations between participants, consistent with various embodiments.

FIG. 5 is a flow diagram of a process 500 for performing offline analysis of conversations between participants, consistent with various embodiments. In some embodiments, the process 500 can be implemented in the call-modeling system 100 of FIG. 1. At block 505, the offline analysis component 110 retrieves historical call data, e.g., call data 105, regarding various conversations between participants, such as a customer and a representative. In some embodiments, the call data 105 can be audio recordings of calls between the participants, transcripts of audio recordings, chat transcripts, etc. The offline analysis component 110 can retrieve the call data 105 from the storage system 125. Further, in some embodiments, the call data 105 can include data regarding only a subset of the conversations stored in the storage system 125.

At block 510, the feature generation component 111 analyzes the call data 105 to extract various features of the conversation, e.g., as described at least with reference to FIGS. 1 and 2. Some example features include transcripts of audio recordings, vocabulary, semantic information of conversations, summarizations of utterances and various natural language entailments, voice signal associated features (e.g., speech rate, speech volume, tone, and timber), emotions (e.g., fear, anger, happiness, timidity, fatigue), inter-speaker features (e.g., similarity of speech rate between speakers, occurrence of first interrupt by customer, extrovert/introvert matching, or gender or age agreement), personality traits (e.g., trustworthiness, engagement, likeability, dominance, charisma, confidence, etc.) and personal attributes (e.g., age, accent, and gender). The feature generation component 111 can also analyze the call data 105 to generate various tags as described above.

At block 515, the classifier component 112 analyzes the features to generate classifiers, e.g., as described at least with reference to FIGS. 1 and 3. The classifier component 112 analyzes the features 115 using various techniques, e.g., machine learning algorithms such as SVM, DNN, to generate the classifiers 120. The classifiers 120 indicate conversation outcomes, e.g., "sales closed", "sales failed," "probability of recommending to a friend," NPS, or customer satisfaction. Each of the classifiers indicates a specific outcome and can include a set of the features that contributed to the specific outcome. For example, in a sales call for renewing a magazine subscription, a classifier "C1" can indicate that when laughter by a customer and two open-ended questions from the representative are registered, there is a high chance, e.g., 83%, of renewal. The classifier component 112 can generate multiple classifiers for the same outcome; however, they have distinct sets of features. Further, the classifier component 112 generates different classifiers for different time windows of the conversations. For example, the classifier component 112 generates a classifier "C1" for first two minutes of the conversations and a classifier "C2" for a third minute of the conversations. The offline analysis component 110 can store the features 115 and the classifiers 120 in a storage system 125.

Figure 6:
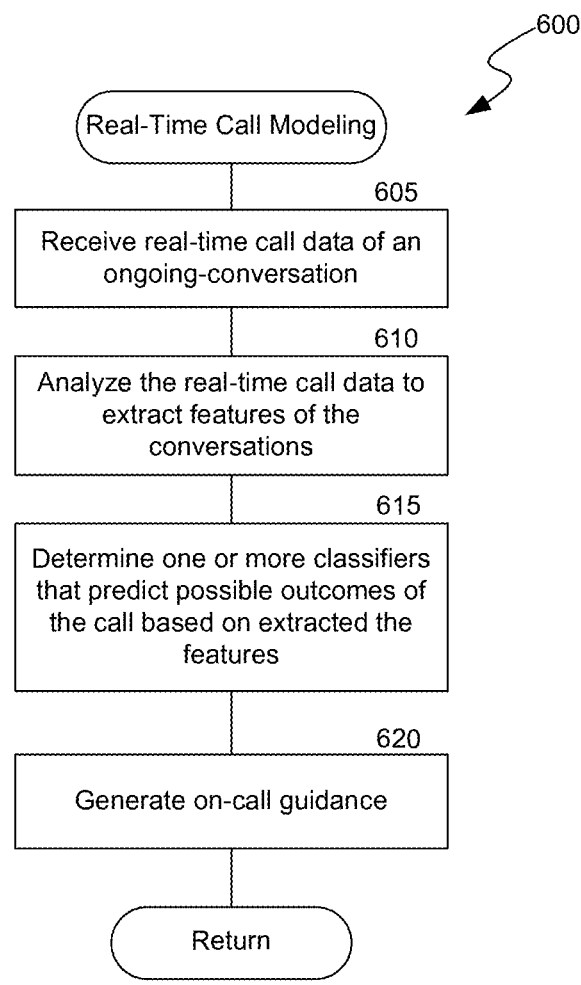
FIG. 6 is a flow diagram of a process for modeling calls between the participants to generate on-call guidance, consistent with various embodiments.

FIG. 6 is a flow diagram of a process 600 for modeling calls between participants to generate on-call guidance, consistent with various embodiments. In some embodiments, the process 600 can be implemented in the call-modeling system 100 of FIG. 1. At block 605, the real-time analysis component 130 receives real-time call data 150 of an ongoing conversation, e.g., an audio stream of a voice call between a customer and a representative. At block 610, the feature generation component 113 analyzes the real-time call data 150 to extract features, e.g., call features 135, of the ongoing conversation, e.g., as described at least with reference to FIGS. 1 and 2. The feature generation component 113 can also analyze the real-time call data 150 to generate various tags as described above.

At block 615, the classifier component 114 inputs the extracted features to classifiers in the storage system, e.g., classifiers 120 which are generated as described at least with reference to process 500 of FIG. 5, to determine one or more classifiers that predict possible outcomes of the call based on the extracted features. For example, as described at least with reference to FIGS. 1 and 4, the classifier component 114 feeds the extracted features 135 into the classifiers 120 generated by the offline analysis component 110, and selects a subset of the classifiers 120, e.g., a set of classifiers 140, that includes features that match with the call features 135 extracted from the live conversation stream. In some embodiments, the set of classifiers 140 include classifiers whose prediction power exceeds a specified threshold. The set of classifiers 140 corresponds to specific outcomes and include real-time probabilities for the specific outcomes.

At block 620, the call-modeling component 116 generates on-call guidance, e.g., on-call guidance 145, that presents the real-time probabilities of possible outcomes of the call as indicated by the set of classifiers 140. The call-modeling component 116 can further analyze the set of classifiers 140 to determine features that have high prediction power, e.g., prediction power exceeding a specified threshold, for predicting a desired outcome, and then include those features and values associated with those features in the on-call guidance 145. The on-call guidance 145 notifies the representative to adopt or persist with an on-call behavior consistent with those features to achieve the desired outcome, or at least to increase the probability of achieving the desired outcome. For example, the on-call guidance 145 can present instructions on a display screen of a user device associated with the representative recommending the representative to change the rate of speech, use specific key words, or pose more open-ended questions to the customer in order to increase the probability of achieving the desired outcome.

Example Usage of the Embodiments

The following is an example usage of the disclosed embodiments for modeling sales calls for renewal of a subscription for a magazine. At a first stage, e.g., before a call is received from a live customer or before a call is placed by a representative, a number of recordings of previous calls is processed by the offline analysis component 110, e.g., using an ASR component 210 that is customized for the field of surgery institutions, an NLP component 225, an affect component 215 and a metadata component 220 to generate various features. The classifier component 112 generates two classifiers, based on those features, that can be found to be highly predictive: (a) a first classifier based on the first two minutes of one or more of the analyzed conversations, which indicates that when a laughter by the customer is registered, the representative engages in rapport building, and at least two open-ended questions are posed by the representative, then there is a high chance, e.g., 83%, of subscription renewal; (b) a second classifier based on the third minute of one or more of the analyzed conversations, which indicates that when a competitor magazine or the key-phrase "read online" is used, and/or the speech rate of the customer is more than three words per second, the renewal chances drop to 10%.

The above two classifiers can then be used by the real-time analysis component 130 in a second stage, e.g., during a live call between the representative and the customer, for generating an on-call guidance to guide the sales representatives as follows. Based on the first classifier, the real-time analysis component 130 can indicate to the sales representative to ask questions within the first 2 minutes. Based on the second classifier, the real-time analysis component 130 can, at minute three of the conversation, urge the representative to reduce speech rate to get the customer to mirror their own speech rate if a competitor is mentioned or otherwise the phrase "read online" is used. If the speech rate is not reduced, the real time analysis component 130 can indicate to the representative and/or their managers to wrap up the call as soon as possible.

The embodiments disclosed above may be implemented as separate modules, e.g., as presented above, as a single module, or any combination thereof. Implementation details may vary, including core machine learning algorithms employed. The embodiments may be implemented using any software development environment or computer language. The embodiments may be provided as a packaged software product, a web-service, an API or any other means of software service. The embodiments may use expert taggers, crowdsourcing or a hybrid approach for tagging.

Figure 7:
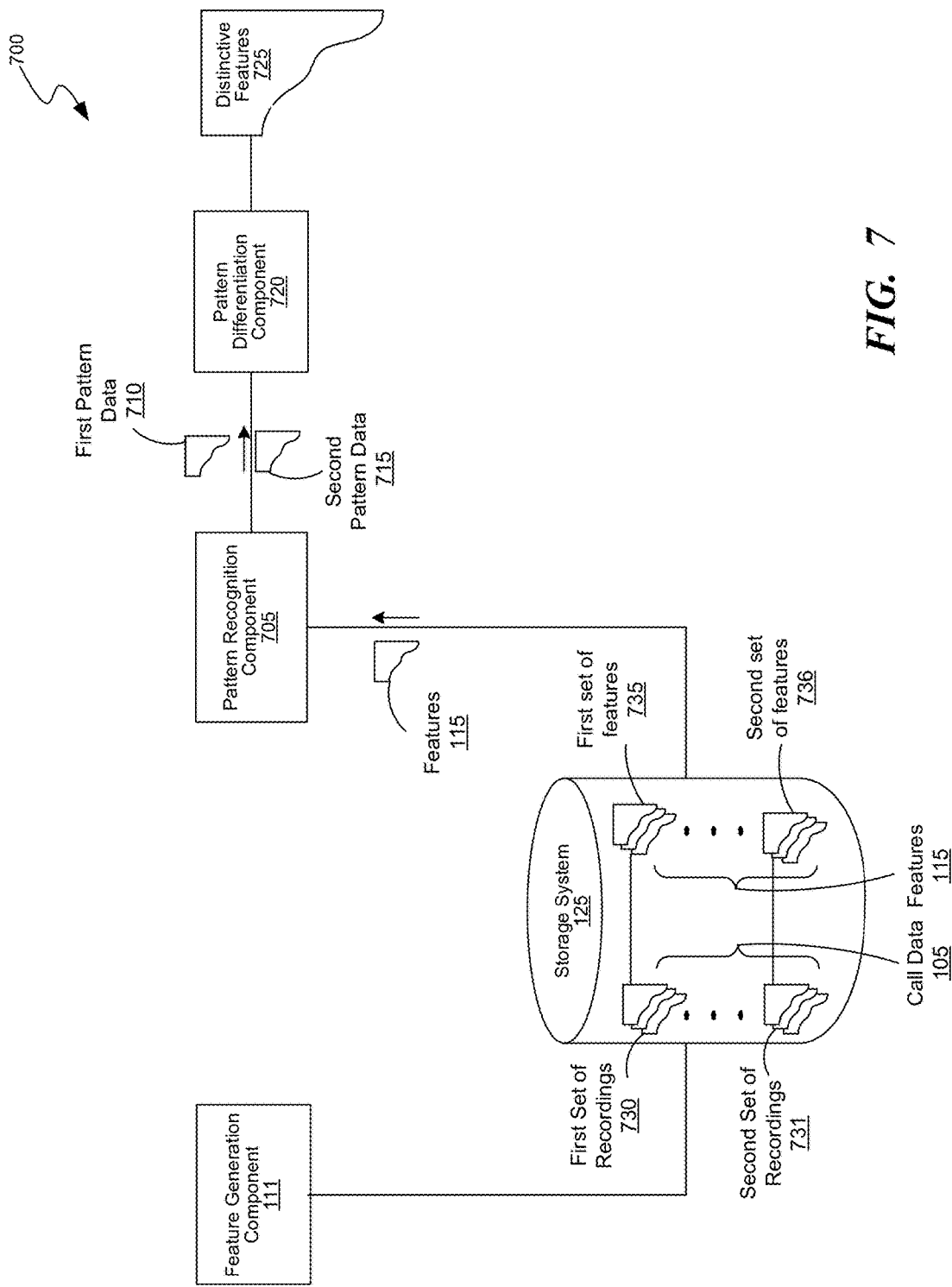
FIG. 7 is a block diagram of a pattern recognition system, consistent with various embodiments.

FIG. 7 is a block diagram of a pattern recognition system, consistent with various embodiments. The pattern recognition system 700 can determine conversation pattern for various groups of representatives. The pattern recognition system 700 includes a feature generation component, such as feature generation component 111 of FIG. 1, that generates features 115 of the conversations by analyzing the call data 105 in the storage system 125, e.g., a first set of recordings 730 and a second set of recordings 731. In some embodiments, the first set of recordings 730 is associated with conversations of a first set of representatives who satisfy a first criterion, and the second set of recordings 731 is associated with conversations of a second set of representatives who do not satisfy the first criterion or satisfy a second criterion. The pattern recognition system 700 includes a pattern recognition component 705 that analyzes the features 115 to determine pattern data that is indicative of a pattern of the conversations of each set of representatives. For example, the pattern recognition component 705 analyzes the first set of features 735 associated with the first set of recordings 730 to determine first pattern data that is indicative of a pattern of the conversations of the first set of representatives. Similarly, the pattern recognition component 705 analyzes the second set of features 736 associated with the second set of recordings 731 to determine second pattern data 715 that is indicative of a pattern of the conversations of the second set of representatives. The pattern recognition system 700 includes a pattern differentiation component 720 that analyzes pattern data of each set of representatives and generates distinctive features 725 that distinguishes the pattern of the conversations between each set of representatives.

Each recording of the first set of recordings 730 is a recording of a conversation between at least one representative from the first set of representatives of an organization and a customer or a prospective customer of the organization, and (b) each recording of the second set of recordings 731 is a recording of a conversation between at least one representative from the second set of representatives of the organization and a customer of the organization. Note that the recordings can be of a conversation that is any of telephone based, VoIP based, video conference based, VR based, AR based, e-mail based, or in-person interaction based.

The first set of representatives can include any representative who satisfies a first specified criterion. For example, the first set of representatives can include top-performing representatives of the organization, and a top-performing representative can include a representative whose performance metric satisfies the first specified criterion such as number of deals won by the representative exceeding a first specified threshold. Continuing with the example, the second set of representatives can be low-performing representatives, e.g., representatives who do not satisfy the first specified criterion, or representatives who satisfy a second specified criterion such as number of deals won by the representative being below a second specified threshold. While the above example is illustrated with reference to top-performing and low-performing representatives, the embodiments can be used for determining conversation pattern of various sets of representatives.

The feature generation component 111 can analyze the call data 105 to extract the features of the conversations. For example, the feature generation component 111 analyzes the first set of recordings 730 to extract a first set of features 735 of the conversation in the first set of recordings 730, and analyzes the second recording 731 to extract a second set of features 736 of the conversation in the second set of recordings 731. In some embodiments, the first set of features 735 and the second set of features 736 are a subset of the features 115. The first set of features 735 can include transcripts of the conversations, vocabulary, semantic information of conversations, summarization of a call, summarizations of utterances and various natural language entailments, voice signal associated features (e.g., speech rate, speech volume, tone, and timber), detected emotions (e.g., fear, anger, happiness, timidity, fatigue, laughter), detected personality traits (e.g., trustworthiness, engagement, likeability, dominance, charisma, confidence, etc.), personal attributes (e.g., age, accent, and gender), and inter-speaker attributes that indicate a comparison between both the participants (e.g., similarity of speech rate between the representative and the customer, extrovert/introvert matching, or gender or age agreement). The first set of features 735 can include vocabulary features such as specific word, phrase, pronouns, and subsets of vocabularies such as "salient" words in which the saliency is determined using any of multiple weighting schemes, e.g., term frequency-inverse document frequency (TF-IDF). The first set of features 735 can also include any of a frequency or timing of setting action items during the conversation, length of utterances and/or turns taken by a participant in talking during the conversation, talk-to-listen ratio of a representative, or any other behavioral feature of the representative.

Further, the first set of features 735 can include not only aural features, but also non-aural features, e.g., visual features such as body language of a participant, and facial expressions of the participant, or any combination of aural and non-aural features. The first set of features 735 can also include information that indicates with which participant a particular feature is associated with. Further, one or more of the first set of features 735 could also be generated from the transcripts of any of emails, online messages, and online meetings. In some embodiments, the feature generation component 111 can determine that any of a word, a phrase, a text, emoji, symbols, or a combination thereof can convey a particular feature. For example, the feature generation component 111 can determine that a text such as "Ha Ha" or "rofl" in the transcript can indicate laughter. In some embodiments, the second set of features 736 includes features similar to that of the first set of features 735.

The pattern recognition component 705 can analyze the features 115 of the conversations to determine pattern data that is indicative of the pattern of the conversation of the representatives. For example, the pattern recognition component 705 analyzes the first set of features 735 associated with the first set of recordings 730 to generate first pattern data 710 that is indicative of a pattern of the conversation of the first set of representatives, and analyzes the second set of features 736 to generate second pattern data 715 that is indicative of a pattern of the conversation of the second set of representatives. The first pattern data 710 can include various features of the conversations, e.g., one or more features from the first set of features 735, that are indicative of the conversation pattern of the first set of representatives. For example, the first pattern data 710 can be generated based on vocabulary features such as a specific word, a phrase, pronouns, subsets of vocabularies such as "salient" words in the conversations; any of a frequency or timing of setting action items during the conversation, length of utterances and/or turns taken by a participant in talking during the conversation, talk-to-listen ratio of a representative in the conversation, or any other behavioral feature of the representative.

In some embodiments, the first pattern data 710 provides various metrics associated with one or more features that are indicative of conversation pattern of the first set of representatives. For example, the first pattern data 710 indicates that the first set of representatives used a specified word a specified number of times, used a specified subset of the vocabulary, e.g., specified salient words, used a specified number of distinct words in a specified duration of the conversation, set action items or tasks at a specified frequency, uttered speech of a specified length, or have a talk-listen ratio of a specified value. One example of the first pattern data 710 can indicate that the usage of the 2-word phrase having collaborative language (e.g., "we could," "we would," "we can," or "we should") is 20% of the total 2-word phrases used by the first set of representatives and the usage of the 2-word phrase having factional language (e.g., "I could," "I would," "You can," or "You should") is 8% of the total 2-word phrases; percentages of the sentences with confidence-inspiring phrases (e.g., "we could definitely," "we could absolutely," or "absolutely right") used by the first set of representatives is 10%; the vocabulary richness of the first set of representatives being approximately 5000 words in 10 hours of conversation.

The pattern recognition component 705 can similarly analyze the features of conversations in the second set of recordings 731 to generate second pattern data 715, which includes various features of the conversations, e.g., one or more features from the second set of features 736, that are indicative of the conversation pattern of the second set of representatives. The second pattern data 715 provides various metrics associated with one or more features that are indicative of conversation pattern of the second set of representatives. In some embodiments, the second pattern data 715 can include metrics similar to those in the first pattern data 710 described above.

Figure 8A:
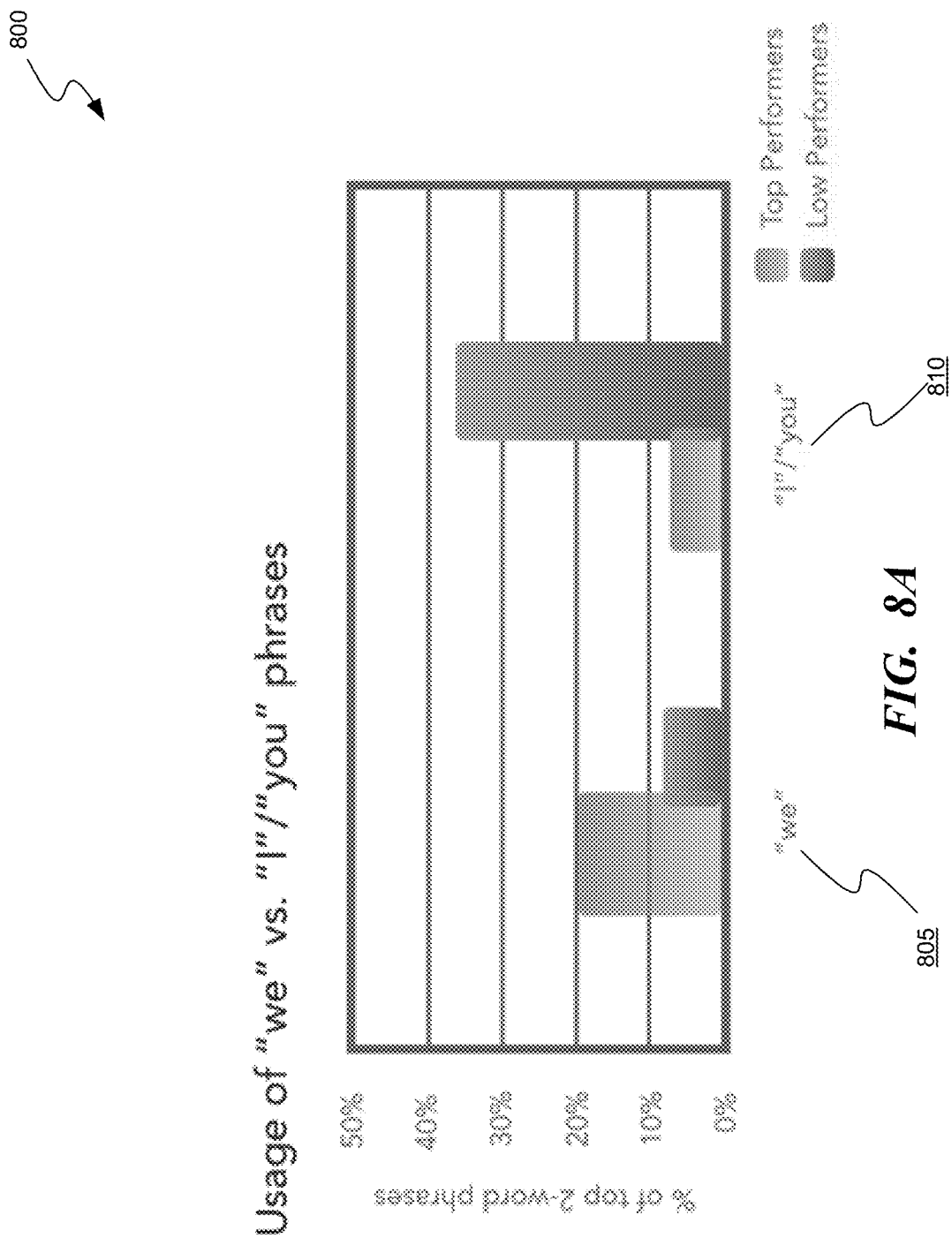
FIG. 8A is an example of distinctive features that distinguish conversations of two sets of representatives, consistent with various embodiments.
Figure 8B:
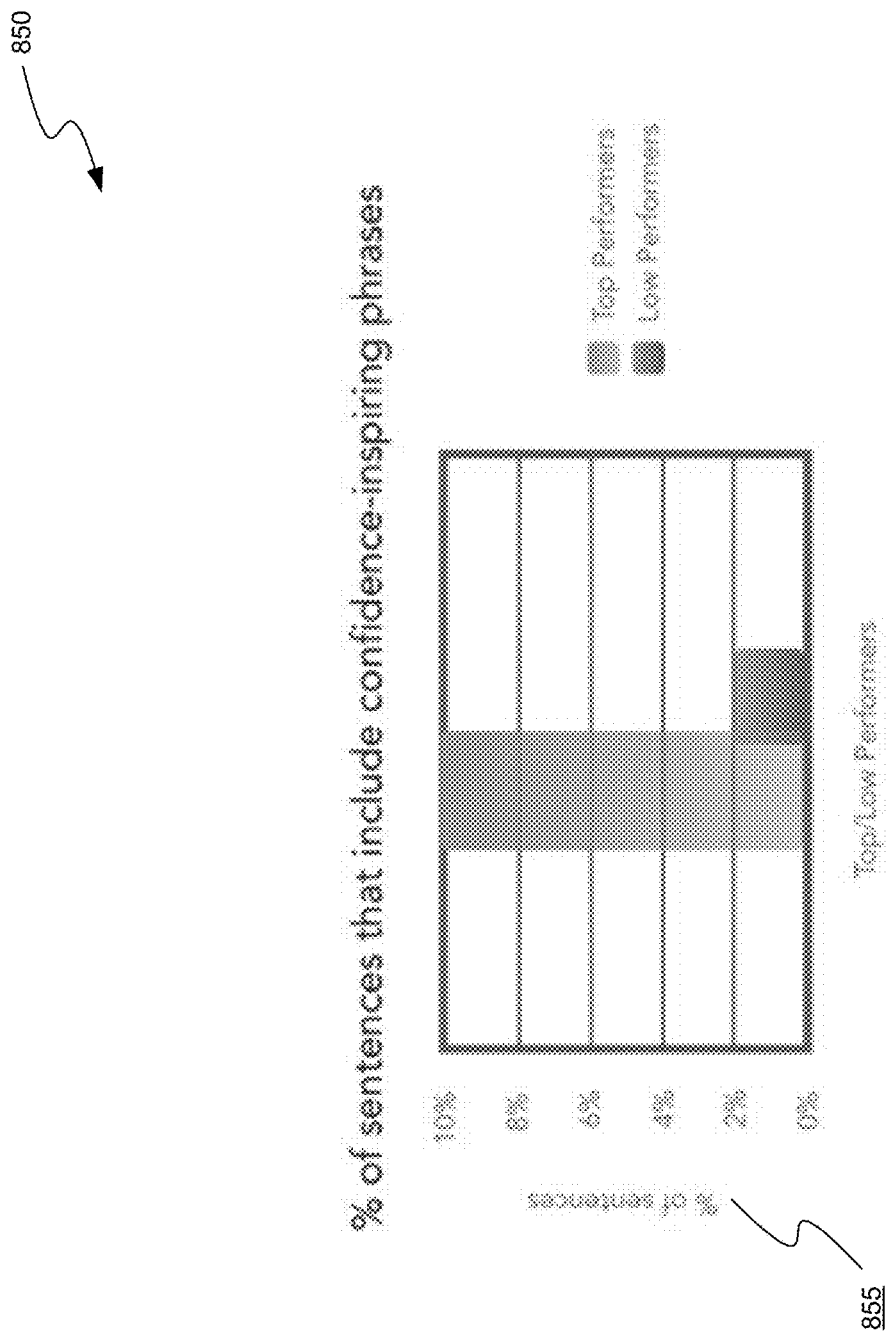
FIG. 8B is an example of a distinctive feature that distinguishes conversations of two sets of representatives, consistent with various embodiments.
Figure 8C:
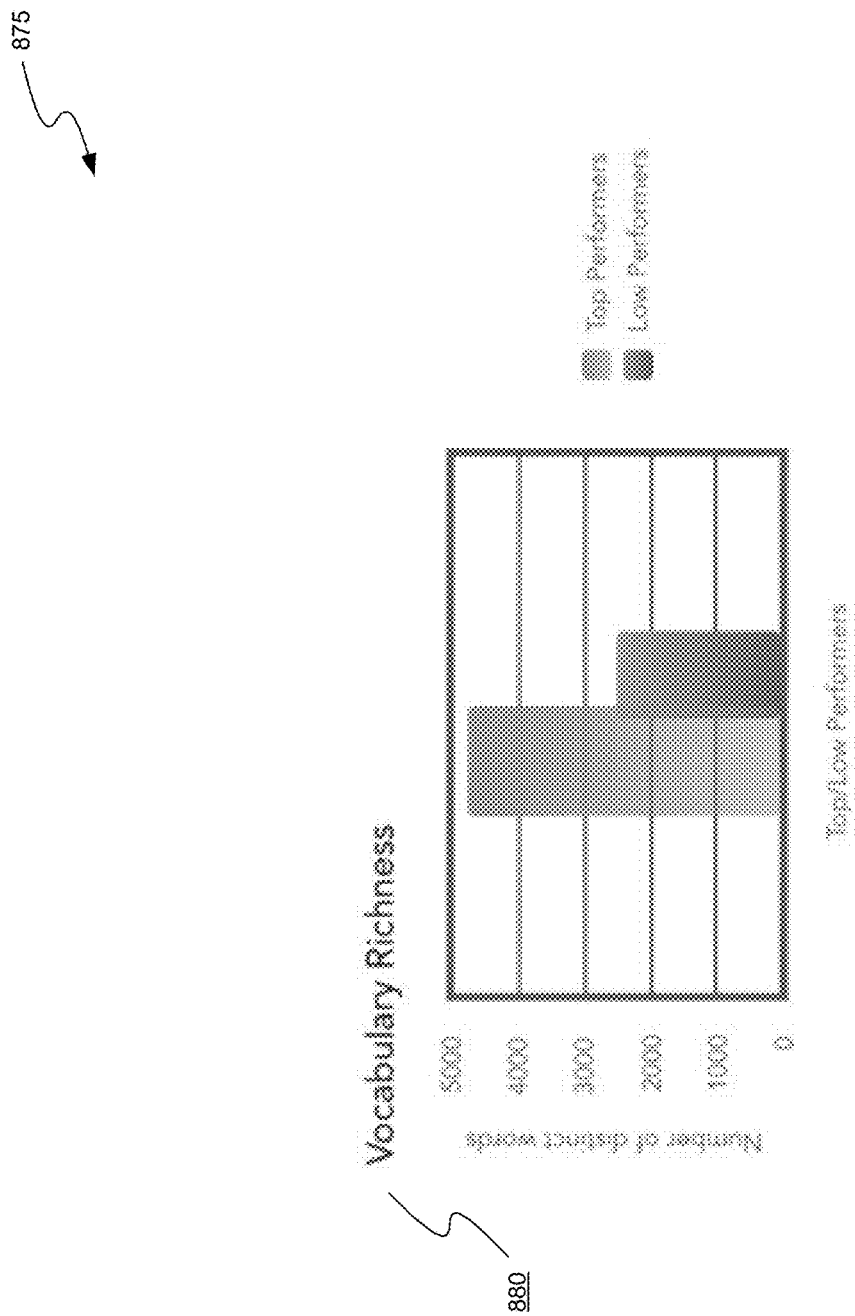
FIG. 8C is an example of a distinctive feature that distinguishes conversations of two sets of representatives, consistent with various embodiments.

The pattern differentiation component 720 analyzes the first pattern data 710 and the second pattern data 715 to generate distinctive features 725, e.g., features that distinguish the conversation pattern between each set of representatives. In some embodiments, the pattern differentiation component 720 generates the distinctive features 725 by determining a correlation between the first pattern data 710 and the second pattern data 715, e.g., a difference between a first value associated with a specified feature in the first pattern data 710 and a second value associated with the specified feature in the second pattern data 715. If the difference exceeds a specified threshold, the specified feature is determined as a distinctive feature. For example, the pattern differentiation component 720 determines that the usage of the 2-word phrases beginning with "we" is 20% of the 2-word phrases used by the first set of representatives and 10% of the 2-word phrases used by the second set of representatives. The pattern differentiation component 720 can determine that the difference of "10%" exceeds a specified threshold and therefore, the usage of 2-word phrase begging with "we" is a distinctive feature between the conversations of the first set of representatives and the second set of representatives. In some embodiments, the specified threshold can be user-configurable, e.g., by a consumer user who is using the pattern recognition system 700, or can be determined by the pattern differentiation component 720, e.g., using AI or ML techniques. The pattern differentiation component 720 can present the distinctive features 725 is various ways. For example, the pattern differentiation component 720 can generate the distinctive features as one or more graphs as illustrated in FIGS. 8A-8C below.

The pattern recognition system 700 can be used for various purposes. For example, the pattern recognition system 700 can be used to determine how the top-performing representatives differ from the low-performing representatives (e.g., based on distinctive features 725), and coach the low-performing representatives accordingly to perform better. Continuing with the above example, the pattern recognition system 700 can determine that the top-performing representatives were more likely to use the collaborative language "we" when conversing with customers or prospects vs. low-performing representatives. In the above example, the top-performing representatives are at least 2 times more likely to use the collaborative language than low-performing representatives. In another example, the pattern recognition system 700 can determine that the top-performing representatives were more likely to use the collaborative language "we" and set more action items and start setting early on in the conversation with customers or prospects vs. low-performing representatives who use the collaborative language less and set lesser number of action items on an average and set them towards the end of the conversation.

Another example usage of the pattern recognition system 700 could be to differentiate between representatives who give discounts, and representatives who don't, or representatives who close large deals vs. representatives who close small deals. In some embodiments, the criterion for considering a deal as a large deal or a small deal may be input to the pattern recognition system 700, e.g., by the consumer user, or can be learnt by the pattern recognition system 700, e.g., using AI and ML techniques.

In some embodiments, the pattern recognition component 705 uses at least one of AI and ML techniques to automatically extract the features, generate pattern data and the distinctive features.

FIG. 8A is an example of distinctive features that distinguish conversations of two sets of representatives, consistent with various embodiments. A first graph 800 presents two distinctive features, e.g., a first distinctive feature 805 and a second distinctive feature 810, that distinguish two sets of representatives. The first graph 800 can be generated by the pattern differentiation component 720 of FIG. 7. In some embodiments, the first distinctive feature 805 and the second distinctive feature 810 are similar to the distinctive features 725 of FIG. 7. In some embodiments, the first set of representatives includes top-performing representatives, and the second set of representatives includes low-performing representatives.

The first graph 800 presents the difference between usage of collaborative language and factional language between the two sets of representatives. In some embodiments, collaborative language includes usage of words such as "we," "our," "us," or "together" and factional language includes usage of words such as "I" versus "you" when referring to the sales reps and the prospect, respectively. Examples of collaborative language in conversations can include:

"[ . . . ] the most specific question here was on how we implement the site . . . "

[ . . . ] to do that then we would upload it and look at the results together . . . "

"I think this may be a great opportunity to show how we could automate the process."

"The great, greatest value right now is particularly [ . . . ] so we may want to look at the report together . . . "

Examples of factional language in conversations can include:

"Well you know, um, I was just saying to join, I was like I was trying to solve this for you . . . "

"What I can suggest you do is try to change the process on your side . . . "

"You could log out before I go over your example . . . "

In some embodiments, the first distinctive feature 805 corresponds to the collaborative language feature, and the second distinctive feature 810 corresponds to the factional language feature.

In some embodiments, the feature generation component 111 analyzes the conversations to determine occurrences of 2-word phrases (e.g., "how are," "it is," "we should," "I can"). The pattern recognition component 705 generates pattern data by analyzing the usage of 2-word phrases for each set of representatives. For example, the pattern recognition component 705 can generate pattern data that indicates that the occurrence of 2-word phrases having collaborative language is 20% of the total 2-word phrases used by the top-performing representatives vs. 10% of the total 2-word phrases used by the low-performing representatives. Similarly, the pattern data can indicate that the occurrence of 2-word phrases having factional language is 8% of the total 2-word phrases used by the top-performing representatives vs. 35% of the total 2-word phrases used by the low-performing representatives.

The pattern differentiation component 720 can determine that the collaborative language feature is distinctive since the relative difference of "200%" in usage of the collaborative language between the top-performing representatives and the low-performing representatives exceeds a specified threshold. Similarly, the pattern differentiation component 720 can determine that the factional language feature is distinctive since the relative difference of approximately "400%" in usage of the factional language between the top-performing representatives and the low-performing representatives exceeds a specified threshold. That is, the first distinctive feature 805, e.g., usage of the word "we" in the collaborative sense, is much more common for top-performing representatives. On the other hand, the second distinctive feature 810, e.g., usage of the words "I" or "you" were much more common for low-performing representatives than for top-performing representatives. The first graph 800 indicates that the top-performing representatives are at least 2 times more likely to use the collaborative language than low-performing representatives, and the low-performing representatives are at least 4 times more likely to use the factional language than top-performing representatives.

In some embodiments, from the distinctive features 805 and 810 one can conclude that top-performing representatives use inclusive and collaborative language when conversing with the customers, whereas low-performing representatives are more factional, separating themselves from their prospects and de-emphasizing empathy. Such information and analysis can be used to coach the low-performing representatives accordingly.

While the above example illustrates the distinctive features based on 2-word phrases, vocabulary features of different "orders", e.g., "n-word phrases" (also referred to as "n-grams"), either contiguous, or with syntactic and semantic skips (also referred to as "skip-grams") can be considered for determining the distinctive features.

FIG. 8B is an example of a distinctive feature that distinguishes conversations of two sets of representatives, consistent with various embodiments. A second graph 850 presents a third distinctive feature 855 that distinguishes the first set of representatives from the second set of representatives. The second graph 850 can be generated by the pattern differentiation component 720 of FIG. 7. In some embodiments, the third distinctive feature 855 is similar to the distinctive features 725 of FIG. 7. In some embodiments, the first set of representatives includes top-performing representatives, and the second set of representatives includes low-performing representatives.

The third distinctive feature 855 corresponds to the usage of sentences having confidence-inspiring phrases by the two sets of representatives. In some embodiments, confidence-inspiring phrases are phrases that denote a confidence of assertions made by the representatives, e.g., "our product can definitely solve this" as opposed to "our product might be able to solve this". Examples of confidence-inspiring words or phrases may include "definitely", "absolutely" or "certainly", either as single word features, or if the system requires higher confidence, as part of larger phrases such as "we definitely can", "I can absolutely", etc.

An example sales conversation exhibiting confidence when overcoming an objection about the pricing or payment can be: " . . . We could definitely come up with some sort of creative payment terms in terms of bi-annually or quarterly or, or something that will that will work for you guys. We can absolutely do this, um, depending on what your needs are."

Another example conversation where a representative is establishing one's ability to join an online meeting room with the customer can be: "Yeah absolutely so we actually have seamless integrations with all the "Saleslofts" and "Outreaches" of the world so, um, yeah exactly right."

The second graph 850 indicates that 10% of the sentences used by the top-performing representatives have confidence-inspiring language while only 2% of the sentences used by the low-performing representatives have confidence-inspiring language. The relative difference of "500%" is determined to exceed a specified threshold and therefore the pattern differentiation component 720 can determine the foregoing feature, e.g., feature corresponding to usage of confidence-inspiring phrases in conversations, as a distinctive feature.

FIG. 8C is an example of a distinctive feature that distinguishes conversations of two sets of representatives, consistent with various embodiments. A third graph 875 presents a fourth distinctive feature 880 that distinguishes the first set of representatives from the second set of representatives. The third graph 875 can be generated by the pattern differentiation component 720 of FIG. 7. In some embodiments, the fourth distinctive feature 880 is similar to the distinctive features 725 of FIG. 7. In some embodiments, the first set of representatives includes top-performing representatives, and the second set of representatives includes low-performing representatives.

The fourth distinctive feature 880 corresponds to vocabulary richness of conversation of the sets of representatives. In some embodiments, vocabulary richness indicates a number of distinct words used by a set of representatives in a conversation of a specified duration. For example, to measure the vocabulary richness of a given sales representative 10 hours of the sales representatives' calls can be randomly chosen and the number of distinct words that appeared more than once can be counted. In some embodiments, this count does not measure how much information is conveyed but rather may be used as a proxy for how eloquently the representative spoke, i.e., how rich his or her vocabulary is.

The third graph 875 indicates that low-performing representatives had smaller vocabularies, using 2,500 words on average during 10 hours of talk, while the top-performing representatives had much larger vocabularies, reaching around 4,000 words or more. The difference of 1500 words between the two sets of representatives is considered to exceed a specified threshold and therefore, the foregoing feature is considered to be a distinctive feature. As described above, the specified threshold can be user-configured or determined by the pattern recognition system 700, e.g., using AI or ML techniques.

In some embodiments, the words that low-performing representatives were missing from their vocabulary in comparison to the top-performing representatives include words that are part of the organization's sales vernacular and were related to their products and offerings, i.e., part of the in-depth knowledge of a specific product that a sales representative has to learn. In other words, this can mean that not only were low-performing representatives pitching less eloquently, but in fact they were missing critical vernacular related to the product they were selling. In some embodiments, the differentiating feature can be vocabulary size, whether or not specific terms/vernacular was used, or a combination of the above. Such an analysis can be used to coach the low-performing representatives accordingly.

In some embodiments, a feature is considered to be distinctive if the feature occurs in the conversation of one of the sets of representatives and does not occur in that of the other set of representatives. For example, a feature such as setting up of action items during a call with a prospective customer, such as setting up a follow-up phone call with the prospective customer, can occur in the conversations of the top-performing representatives but not in the conversations of the low-performing representatives. Accordingly, setting up of action items feature can be considered as a distinctive feature.

FIGS. 8A-8C are just examples of some distinctive features. The pattern recognition system 700 determine many such distinctive features. Further, the pattern recognition system 700 can be configured to determine the distinctive features from a user-defined set of features, or learn the distinctive features, e.g., using AI or ML techniques.

Figure 9:
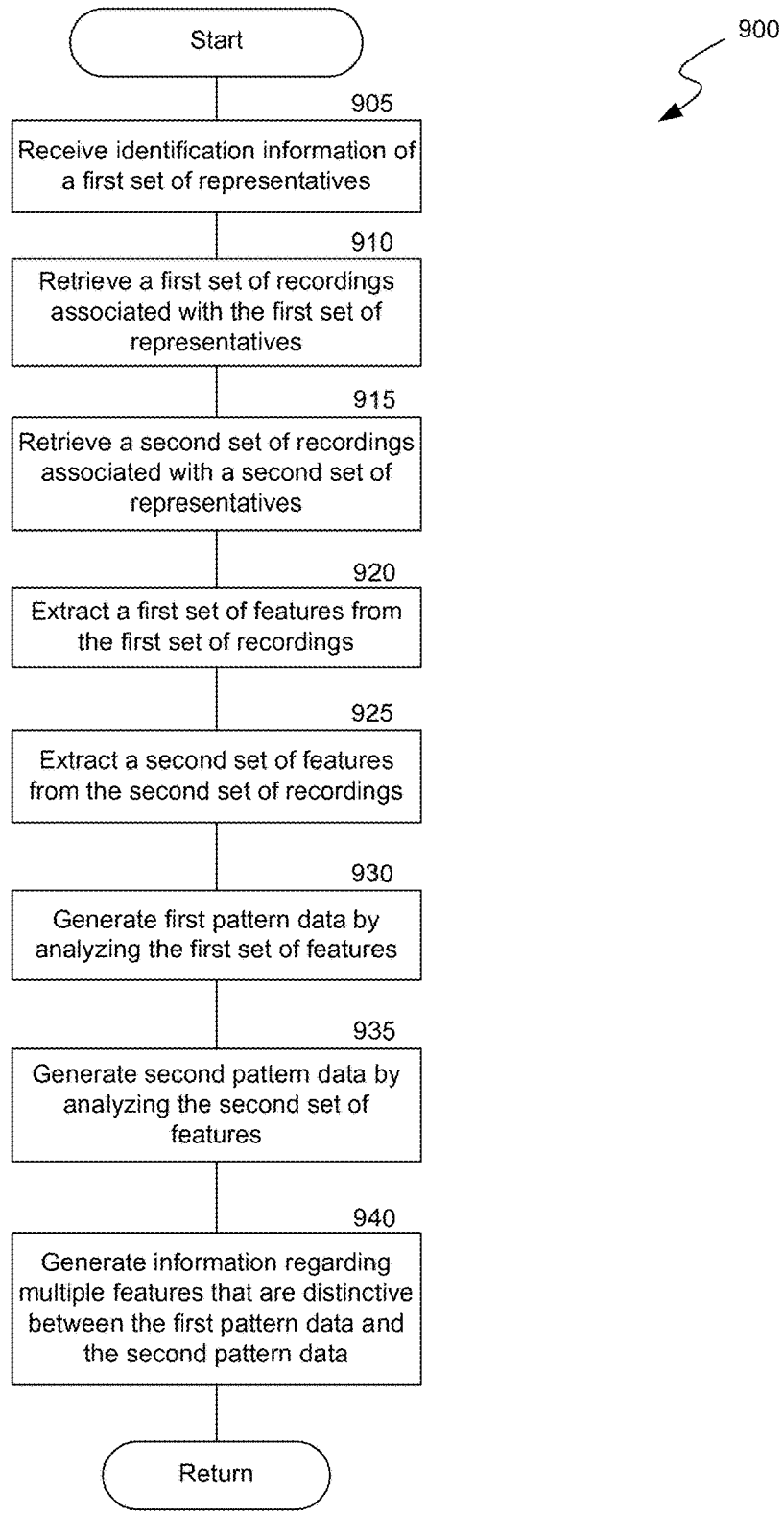
FIG. 9 is a flow diagram of a process for generating distinctive features of conversations of two sets of representatives, consistent with various embodiments.

FIG. 9 is a flow diagram of a process for generating distinctive features of conversations of two sets of representatives, consistent with various embodiments. In some embodiments, the process 900 can be implemented using the pattern recognition system 700 of FIG. 7. At block 905, the feature generation component 110 receives identification information of a first set of representatives. In some embodiments, the first set of representatives includes representatives who satisfy a specified criterion, e.g., representatives whose performance metric exceeds a specified threshold. For example, the first set of representatives can be top-performing representatives who have won a number of deals exceeding a specified threshold. The identification information of the first set of representatives can include user identification (ID) of the first set of representatives.

At block 910, the feature generation component 111 retrieves a first set of recordings associated with the first set of representatives, e.g., the first set of recordings 730. The first set of recordings is recordings of conversations associated with the first set of representatives.

At block 915, the feature generation component 111 retrieves a second set of recordings associated with a second set of representatives, e.g., the second set of recordings 731. In some embodiments, the second set of representatives is representatives who do not satisfy the specified criterion, or representatives who not satisfy a second criterion. For example, the second set of representatives can be low-performing representatives who have won a number of deals below the specified threshold. The second set of recordings is recordings of conversations associated with the second set of representatives.

At block 920, the feature generation component 111 extracts features from the first set of recordings, e.g., the first set of features 735. The first set of features 735 can indicate characteristics of any of (a) a customer in a corresponding conversation, (b) a representative in the corresponding conversation (one of the first set of representatives), or (c) the corresponding conversation.

At block 925, the feature generation component 111 extracts features from the second set of recordings, e.g., the second set of features 736. The second set of features 736 can indicate characteristics of any of (a) a customer in a corresponding conversation, (b) a representative in the corresponding conversation (one of the second set of representatives), or (c) the corresponding conversation.

At block 930, the pattern recognition component 705 analyzes the first set of features to generate first pattern data, e.g., the first pattern data 710, that is indicative of the pattern of the conversation of the first set of representatives. In some embodiments, the first pattern data 710 provides various metrics associated with one or more features that are indicative of conversation pattern of the first set of representatives.

At block 935, the pattern recognition component 705 analyzes the second set of features to generate second pattern data, e.g., the second pattern data 715, that is indicative of the pattern of the conversation of the first set of representatives. In some embodiments, the first pattern data 710 provides various metrics associated with one or more features that are indicative of conversation pattern of the second set of representatives.

At block 940, the pattern differentiation component 720 analyzes the first pattern data and the second pattern data to generate distinctive features, e.g., distinctive features 725, that distinguish the conversation pattern of the first set of representatives from the second set of representatives. For example, the pattern differentiation component 720 determines that the usage of the 2-word phrases having collaborative language, which is 20% of the total 2-word phrases used by the first set of representatives and 10% of the total 2-word phrases used by the second set of representatives, is a distinctive feature. The generation of distinctive features is described in detail at least with reference to FIG. 7 and FIGS. 8A-8C and 10.

Figure 10:
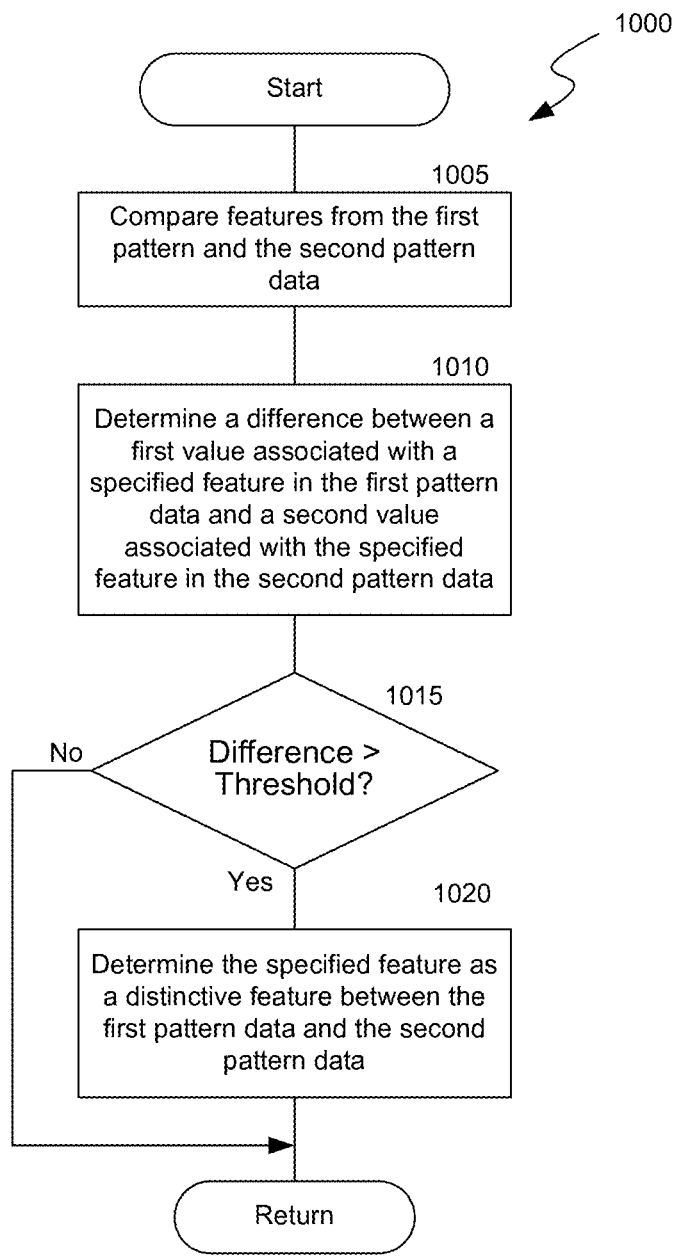
FIG. 10 is a flow diagram of a process for generating distinctive features of conversations of two sets of representatives, consistent with various embodiments.

FIG. 10 is a flow diagram of a process 1000 for generating distinctive features of conversations of two sets of representatives, consistent with various embodiments. In some embodiments, the process 1000 can be implemented using the pattern recognition system 700 of FIG. 7 and as part of block 940 of process 900 of FIG. 9.

At block 1005, the pattern differentiation component 720 compares the features from the first pattern data, e.g., the first pattern data 710, and the second pattern data, e.g., the second pattern data 715.

At block 1010, the pattern differentiation component 720 determines a difference between a first value associated with a specified feature in the first pattern data 710 and a second value associated with the specified feature in the second pattern data 715. For example, the pattern differentiation component 720 determines from the first pattern data 710 that the usage of the 2-word phrases having collaborative language is 20% of the total 2-word phrases used by the first set of representatives, and determines from the second pattern data 715 that the usage of the 2-word phrases having the collaborative language is 10% of the total 2-word phrases used by the second set of representatives. The pattern differentiation component 720 can then determine that the relative difference in usage is "200%."

At determination block 1015, the pattern differentiation component 720 determines whether the difference exceeds a specified threshold. In some embodiments, the specified threshold can be configurable by a consumer user, e.g., user of the pattern recognition system 700.

If the difference exceeds the specified threshold, at block 1020, the pattern differentiation component 720 determines the specified feature as a distinctive feature of the conversations of the two sets of representatives. On the other hand, if the difference does not exceed the specified threshold, the process 100 returns.

Figure 11:
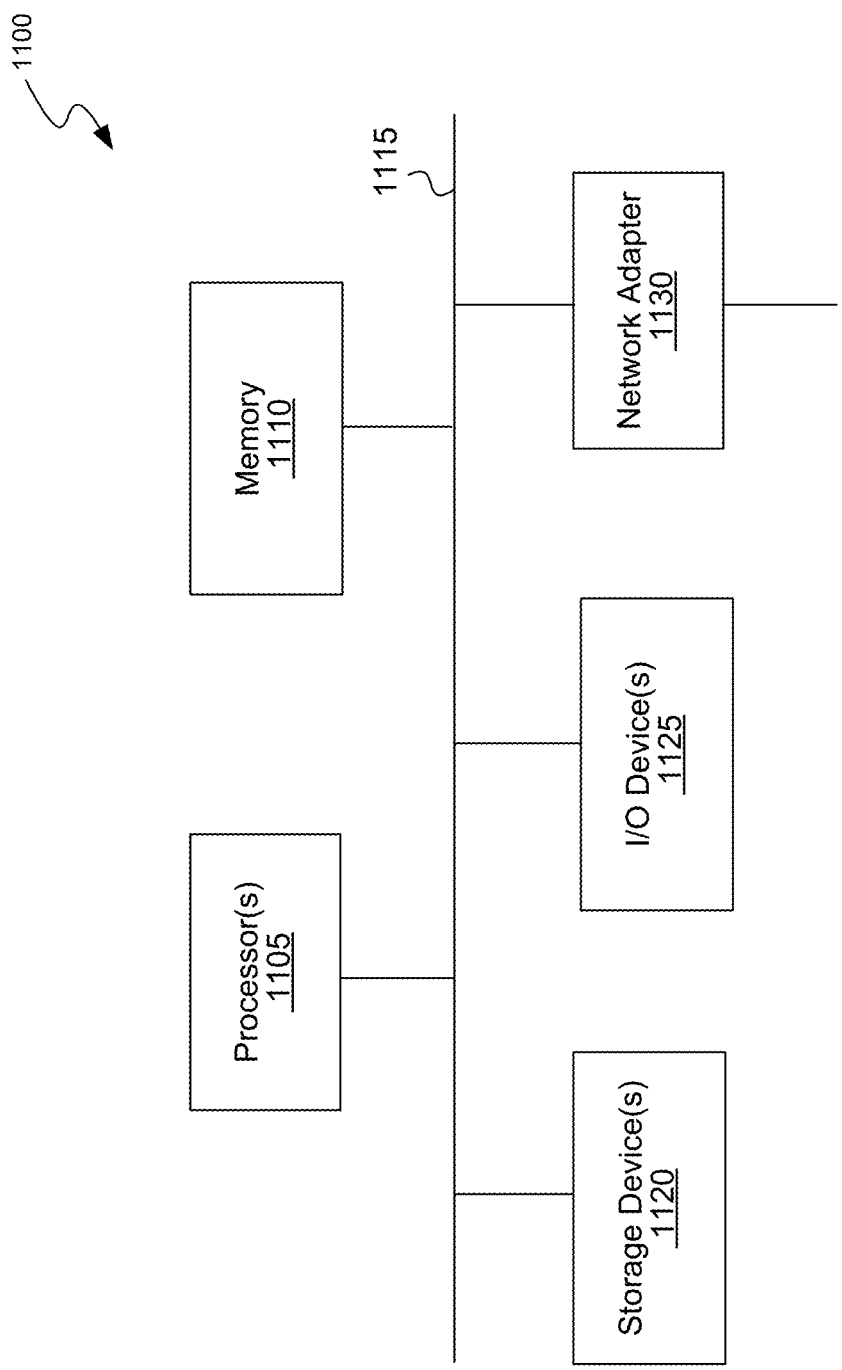
FIG. 11 is a block diagram of a processing system that can implement operations of the disclosed embodiments.

FIG. 11 is a block diagram of a computer system as may be used to implement features of the disclosed embodiments. The computing system 1100 may be used to implement any of the entities, components or services depicted in the examples of the foregoing figures (and any other components described in this specification). The computing system 1100 may include one or more central processing units ("processors") 1105, memory 1110, input/output devices 1125 (e.g., keyboard and pointing devices, display devices), storage devices 1120 (e.g., disk drives), and network adapters 1130 (e.g., network interfaces) that are connected to an interconnect 1115. The interconnect 1115 is illustrated as an abstraction that represents any one or more separate physical buses, point to point connections, or both connected by appropriate bridges, adapters, or controllers. The interconnect 1115, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1110 and storage devices 1120 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media) and computer-readable transmission media.

The instructions stored in memory 1110 can be implemented as software and/or firmware to program the processor(s) 1105 to carry out actions described above. In some embodiments, such software or firmware may be initially provided to the processing system 1100 by downloading it from a remote system through the computing system 1100 (e.g., via network adapter 1130).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described, which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A computer-implemented method, comprising:
    receiving identification information regarding a first set of representatives;
    retrieving a first set of recordings of conversations associated with the first set of representatives, wherein each conversation includes at least one of multiple customers and at least one representative from the first set of representatives;
    retrieving a second set of recordings of conversations associated with a second set of representatives, wherein each conversation includes at least one of the multiple customers and at least one representative from the second set of representatives;
    extracting a first set of features from the first set of recordings and a second set of features from the second set of recordings to generate multiple features, wherein the multiple features indicate characteristics of any of (a) a customer of multiple customers in the corresponding conversation, (b) a representative of multiple representatives in the corresponding conversation, (c) the corresponding conversation;
    generating a first pattern data by analyzing the first set of features, the first pattern data indicative a pattern of the conversation of the first set of representatives;
    generating a second pattern data by analyzing the second set of features, the second pattern data indicative of a pattern of the conversation of the second set of representatives; and
    generating multiple distinctive features that are distinctive between the first pattern data and the second pattern data by analyzing the first set of features and the second set of features.

2. The computer-implemented method of claim 1, wherein
    receiving the identification information of the first set of representatives includes:

determining those of the multiple representatives that satisfy a specified criterion as the first set of representatives.

3. The computer-implemented method of claim 2, wherein the specified criterion includes those of the multiple representatives having a performance indicator whose value satisfies the specified criterion.

4. The computer-implemented method of claim 2, wherein the second set of representatives includes those of the multiple representatives that do not satisfy the specified criterion.

5. The computer-implemented method of claim 1, wherein extracting the first set of features includes:
generating features that include a transcription, vocabulary and a language model of the conversations as a first output.

6. The computer-implemented method of claim 5, wherein extracting the first set of features includes:
generating, using the first output, features that include semantic information from the conversations.

7. The computer-implemented method of claim 1, wherein extracting the first set of features includes:
generating a set of low-level features that indicate information associated with a voice signal in the multiple recordings, and a set of high-level features that include personality traits and personal attributes of the multiple representatives and emotion data that indicates emotions of the multiple representatives.

8. The computer-implemented method of claim 1, wherein extracting the first set of features includes generating features that include data regarding conversation flow.

9. The computer-implemented method of claim 1, wherein extracting the first set of features includes generating features related a representative-customer pair in a conversation of the conversations.

10. The computer-implemented method of claim 1, wherein extracting the first set of features includes:
generating a speaker engagement metric that includes information regarding a degree of engagement of a specified customer of the multiple customers in a conversation of the multiple conversations.

11. The computer-implemented method of claim 1, wherein extracting the first set of features includes extracting a visual feature associated with a conversation of the conversations.

12. The computer-implemented method of claim 1, wherein generating the first pattern data includes generating the first pattern data based on a usage of vocabulary by the first set of representatives, the first pattern data including usage of a specified word or a phrase.

13. The computer-implemented method of claim 1, wherein generating the first pattern data includes generating the first pattern data based on a usage of a specified subset of vocabulary by the first set of representatives, the specified subset including one or more words or phrases that are determined by a weighting scheme.

14. The computer-implemented method of claim 13, wherein the weighting scheme is term frequency-inverse document frequency (TF-IDF).

15. The computer-implemented method of claim 1, wherein generating the first pattern data includes generating the first pattern data based on at least one of a frequency of setting an action item or a timing of setting the action in a conversation by the first set of representatives.

16. The computer-implemented method of claim 1, wherein generating the first pattern data includes generating the first pattern data based on a length of utterances by the first set of representatives.

17. The computer-implemented method of claim 1, wherein generating the first pattern data includes generating the first pattern data based on a talk-listen ratio of the first set of representatives.

18. The computer-implemented method of claim 1, wherein generating the distinctive features includes:
determining a difference between a first value associated with a specified feature in the first pattern data and a second value associated with the specified feature in the second pattern data, and
determining the specified feature as a distinctive feature of the distinctive features between the first pattern data and the second pattern data if the difference exceeds a specified threshold.

19. The computer-implemented method of claim 1, wherein generating the distinctive features includes determining those of the multiple features that occur in the first pattern data but not in the second pattern data.

20. The computer-implemented method of claim 1, wherein generating the distinctive features includes determining those of the multiple features that occur in the second pattern data but not in the first pattern data.

21. The computer-implemented method of claim 1, wherein extracting the first set of features includes extracting the multiple features using any of an artificial intelligence, a machine learning, or natural language processing technique.

22. The computer-implemented method of claim 1, wherein at least one of the first set of recordings includes a recording of a video call between one of the customers and one of the first set of representatives.

23. The computer-implemented method of claim 1, wherein at least one of the first set of recordings includes an online meeting between one of the customers and one of the first set of representatives.

24. The computer-implemented method of claim 1, wherein at least one of the multiple recordings includes a recording of a virtual reality-based conversation between one of the customers and one of the multiple representatives.

25. The computer-implemented method of claim 1, wherein at least one of the multiple recordings includes a recording of an augmented reality-based conversation between one of the customers and one of the multiple representatives.

26. The computer-implemented method of claim 1, wherein at least one of the multiple recordings includes an e-mail conversation between one of the customers and one of the multiple representatives.

27. A non-transitory computer-readable storage medium storing computer-readable instructions, comprising:
instructions for extracting a first set of features from a first set of recordings and a second set of features from a second set of recordings to generate multiple features, wherein the first set of recordings include conversations of a first set of representatives, wherein the second set of recordings include conversations of a second set of representatives, wherein the multiple features indicate characteristics of any of (a) a customer of multiple customers in the corresponding conversation, (b) a representative of multiple representatives in the corresponding conversation, (c) the corresponding conversation;
instructions for generating:

first pattern data by analyzing the first set of features, the first pattern data indicative a pattern of the conversation of the first set of representatives with a first set of customers, and second pattern data by analyzing the second set of features, the second pattern data indicative of a pattern of the conversation of the second set of representatives with a second set of customers; and instructions for determining a correlation of features between the first pattern data and the second pattern data, wherein the correlation is indicative of a difference between a specified feature of the multiple features in the first pattern data and the second pattern data.

28. The non-transitory computer-readable storage medium of claim 27, wherein the instructions for extracting the first set of features includes instructions for extracting a visual feature associated with a conversation of the conversations.

29. The non-transitory computer-readable storage medium of claim 27, wherein the instructions for generating the first pattern data include:
instructions for generating the first pattern data based on a usage of vocabulary by the first set of representatives, the first pattern data including usage of a specified word or a phrase.

30. The non-transitory computer-readable storage medium of claim 27, wherein the instructions for generating the first pattern data include:
instructions for generating the first pattern data based on a usage of a specified subset of the vocabulary by the first set of representatives, the specified subset including one or more words or phrases that are determined by a weighting scheme.

31. The non-transitory computer-readable storage medium of claim 27, wherein the instructions for generating the first pattern data include:
instructions for generating the first pattern data based on at least one of a frequency of setting an action item or a timing of setting the action in a conversation by the first set of representatives.

32. The non-transitory computer-readable storage medium of claim 27, wherein the instructions for generating the first pattern data include:
instructions for generating the first pattern data based on a length of utterances by the first set of representatives.

33. The non-transitory computer-readable storage medium of claim 27, wherein the instructions for generating the first pattern data include:
instructions for generating the first pattern data based on a talk-listen ratio of the first set of representatives.

34. The non-transitory computer-readable storage medium of claim 27, wherein the instructions for determining the correlation of features include:
instructions for determining the difference between a first value of the specified feature in the first pattern data and a second value of the specified feature in the second pattern data, and instructions for determining the specified feature as a distinctive feature between the first pattern data and the second pattern data if the difference exceeds a specified threshold.

35. A system, comprising:
a first component that is configured to extract a first set of features from a first set of recordings and a second set of features from a second set of recordings to generate multiple features, wherein the first set of recordings include conversations of a first set of representatives, wherein the second set of recordings include conversations of a second set of representatives, wherein the multiple features indicate characteristics of any of (a) a customer of multiple customers in the corresponding conversation, (b) a representative of multiple representatives in the corresponding conversation, (c) the corresponding conversation;

a second component that is configured to generate:
first pattern data by analyzing the first set of features, the first pattern data indicative a pattern of the conversation of the first set of representatives with a first set of customers, and second pattern data by analyzing the second set of features, the second pattern data indicative of a pattern of the conversation of the second set of representatives with a second set of customers; and a third component that is configured to determine a correlation of features between the first pattern data and the second pattern data, wherein the correlation is indicative of a difference between a specified feature of the multiple features in the first pattern data and the second pattern data.

* * * * *